United States Patent [19]
Chiuminatta et al.

[11] Patent Number: 5,570,677
[45] Date of Patent: * Nov. 5, 1996

[54] METHOD AND APPARATUS FOR CUTTING WET CONCRETE

[76] Inventors: Edward R. Chiuminatta, 16405 Everett; Alan R. Chiuminatta, 16862 Mariposa Ave., both of Riverside, Calif. 92504

[*] Notice: The portion of the term of this patent subsequent to May 5, 2015, has been disclaimed.

[21] Appl. No.: 404,930

[22] Filed: Mar. 16, 1995

Related U.S. Application Data

[63] Continuation of Ser. No. 17,140, Feb. 12, 1993, Pat. No. 5,429,109, which is a continuation-in-part of Ser. No. 837,248, Feb. 14, 1992, Pat. No. 5,305,729.

[51] Int. Cl.⁶ .......................................................... B27D 1/04
[52] U.S. Cl. .......................................... 125/15; 125/13.01
[58] Field of Search .................................. 125/12, 13.01; 30/371, 374, 375, 377, 388, 390; 451/358, 353, 454, 457, 451, 352; 83/875; 264/162, 152

[56] References Cited

U.S. PATENT DOCUMENTS

| | | |
|---|---|---|
| 995,971 | 6/1911 | Keyes . |
| 1,356,339 | 10/1920 | Clarke . |
| 1,404,342 | 1/1922 | Clarke . |
| 1,731,872 | 10/1929 | Schons . |
| 1,736,538 | 11/1929 | Kurtz . |

(List continued on next page.)

FOREIGN PATENT DOCUMENTS

| | | |
|---|---|---|
| 143003 | 5/1985 | European Pat. Off. . |
| 3444414 | 6/1986 | Germany . |
| 61-19006 | 2/1986 | Japan . |

OTHER PUBLICATIONS

Walking Groover & Edgers Data Sheet, Bates No. 000019, undated.
Rockwell Portable Saw Accessories Data Sheet, Bates No. 000020, undated.
Rockwell Portable Saw Accessories Data Sheet, Bates No. 000021, undated.
Guide for Concrete Floor and Slab Construction, American Concrete Institute, Detroit, Mich. 1980.
Concrete Construction, "Saw Cuts Concrete Immediately After Finishing", pp. 336 and 338, Mar. 1988.
Target Microcon, Operating Instructions, Part List, Bates Nos. 305–310, 1992.

(List continued on next page.)

*Primary Examiner*—D. S. Meislin
*Assistant Examiner*—Derris H. Banks
*Attorney, Agent, or Firm*—Knobbe Martens Olson & Bear

[57] ABSTRACT

A concrete cutting saw is provided for the cutting of grooves in the surface of wet concrete. The concrete saw generally comprises a motor driven rotating cutting blade mounted on a support structure. The concrete saw is supported during cutting by wheels, and has a skid plate with a slot through which the rotating cutting blade passes to cut the concrete. The cutting blade is mounted with a sound deadening blade housing and a number of shields and guards located about the skid plate. The skid plate is movably attached to the concrete saw and resiliently urged against the concrete during cutting so that it remains in contact with the surface of the concrete surrounding the cutting blade during cutting. The skid plate is constrained into a bowed configuration so that it is substantially flat during cutting. A variable speed transmission is drivingly connected to the wheels to propel the saw across the concrete during cutting. A sensor detects the relative position of the skid plate and the cutting blade to generate an electric signal which cooperates with the variable speed transmission to slow down the saw as it encounters hard aggregate, and to speed up the saw as it encounters soft concrete. A distance counter measures and displays the distance which the saw travels during cutting.

29 Claims, 19 Drawing Sheets

U.S. PATENT DOCUMENTS

| | | |
|---|---|---|
| 1,740,074 | 12/1929 | Crowe . |
| 1,806,528 | 5/1931 | Fegley et al. . |
| 1,813,231 | 7/1931 | Crowe . |
| 1,830,579 | 11/1931 | Wappat . |
| 1,916,887 | 7/1933 | McClain . |
| 2,344,262 | 3/1944 | Odierna et al. . |
| 2,623,557 | 12/1952 | Kendall . |
| 2,673,725 | 3/1954 | Coates . |
| 2,688,347 | 9/1954 | Schmidt ................................... 143/43 |
| 2,700,256 | 1/1955 | Lewis . |
| 2,701,134 | 2/1955 | Klicpera . |
| 2,722,244 | 11/1955 | Schultz . |
| 2,949,068 | 8/1960 | Gresham . |
| 2,996,089 | 8/1961 | McCarty . |
| 3,270,785 | 9/1966 | Molitor . |
| 3,301,601 | 1/1967 | Zuzelo . |
| 3,353,266 | 11/1967 | Goolsby . |
| 3,496,972 | 2/1970 | Rees . |
| 3,585,980 | 6/1971 | Mellor . |
| 3,623,518 | 11/1971 | Nicotra . |
| 3,707,768 | 1/1973 | Spengler . |
| 3,722,496 | 3/1973 | Schuman . |
| 3,775,529 | 11/1973 | Steenson et al. . |
| 3,910,711 | 10/1975 | Moorhead . |
| 3,973,324 | 8/1976 | Persson . |
| 4,022,182 | 5/1977 | Lenkevich . |
| 4,055,160 | 10/1977 | Wilson . |
| 4,062,110 | 12/1977 | Alvarez . |
| 4,188,934 | 2/1980 | Reinhardt et al. ........................... 125/4 |
| 4,247,148 | 1/1981 | Ericsson . |
| 4,334,356 | 6/1902 | Krosunger ................................ 30/374 |
| 4,397,089 | 8/1983 | Pease . |
| 4,406,274 | 9/1983 | Ogyu . |
| 4,416,842 | 11/1983 | Nash et al. ............................... 264/145 |
| 4,456,303 | 6/1984 | Due .......................................... 299/10 |
| 4,483,071 | 11/1984 | te Kolste . |
| 4,545,121 | 10/1985 | Armbruster et al. . |
| 4,620,525 | 11/1986 | Toncelli . |
| 4,769,201 | 9/1988 | Chiuminatta et al. . |
| 4,835,954 | 6/1989 | Enzmann . |
| 4,856,394 | 8/1989 | Clowers . |
| 4,889,675 | 12/1989 | Chiuminatta et al. ..................... 125/13 |
| 4,903,680 | 2/1990 | Chiuminatta et al. ................... 264/154 |
| 4,928,662 | 5/1990 | Chiuminatta et al. . |
| 4,938,201 | 7/1990 | Chiuminatta et al. . |
| 4,984,369 | 1/1991 | Flint et al. . |
| 5,056,499 | 10/1991 | Chiuminatta et al. ..................... 125/14 |
| 5,241,946 | 9/1993 | Yelton et al. . |

OTHER PUBLICATIONS

Diamond Tech, Inc. Data Sheet on HS–1500, 3 H.P. Electric Hand Saw, Bates Nos. 000011–000012, undated.

Hydraulic Hand Saw, Bates Nos. 000013–000014, undated.

Christedsed Model CM–108 Data Sheet, Bates No. 000015, undated.

SMG Machines–Abrasifs, Eurocoup Master Data Sheet, Bates No. 000016, undated.

Jigsaw Accessories Data Sheet, Bates No. 000017, undated.

Pro–Choice Bronze Groovers Data Sheet, Bates No. 000018, undated.

Quickie High Speed Saws, "Electric Quickie" Data Sheet, undated.

Bosch C. Chop Saw 1340–Figure Sheet (p. 2), Bates No. 000001, undated.

AEG Motor Company, Bates No. 000002, undated.

SMG Machines Abrasifs, Eurocoup Brochure, Bates Nos. 000003–000005, Circa 1988.

GDM Inc., Handicut Model 14H Brochure, Bates Nos. 000006–000009, Circa 1983.

Bosch Data Sheet of Foam Rubber Cutter, Bates No. 000010, undated.

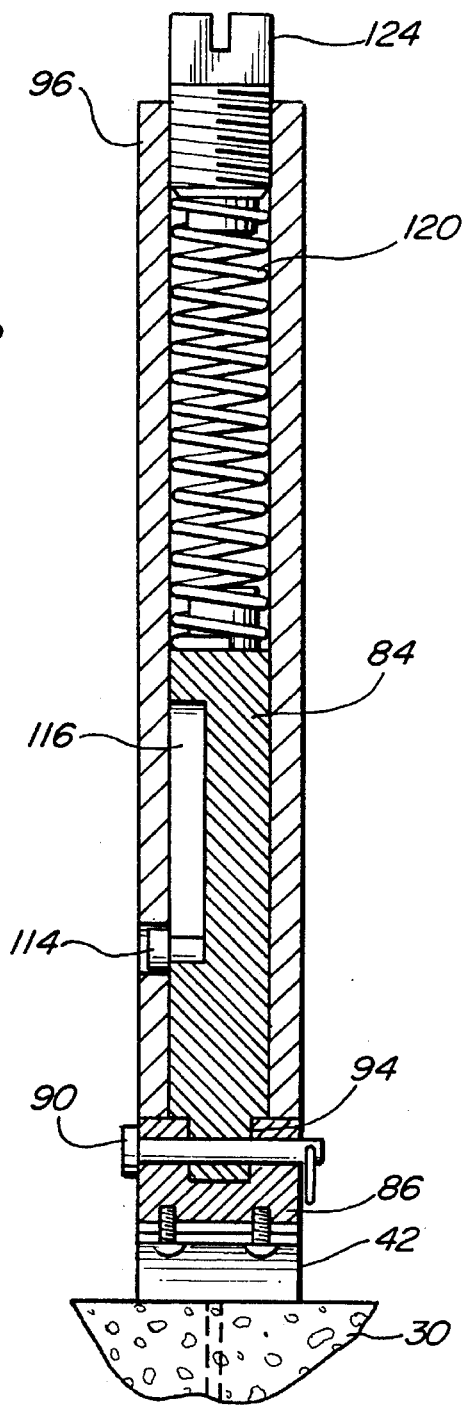
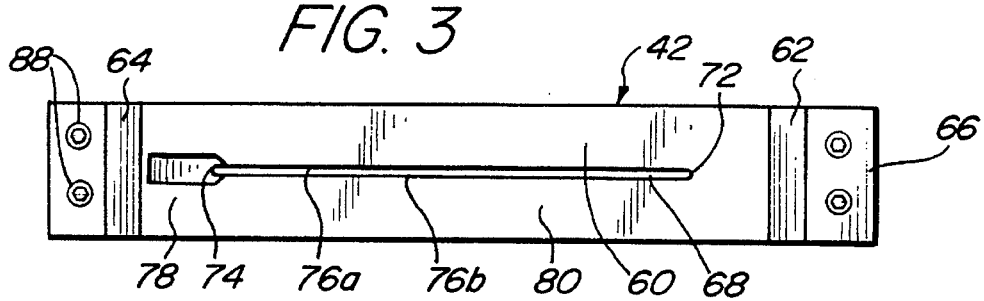

FIG. 9
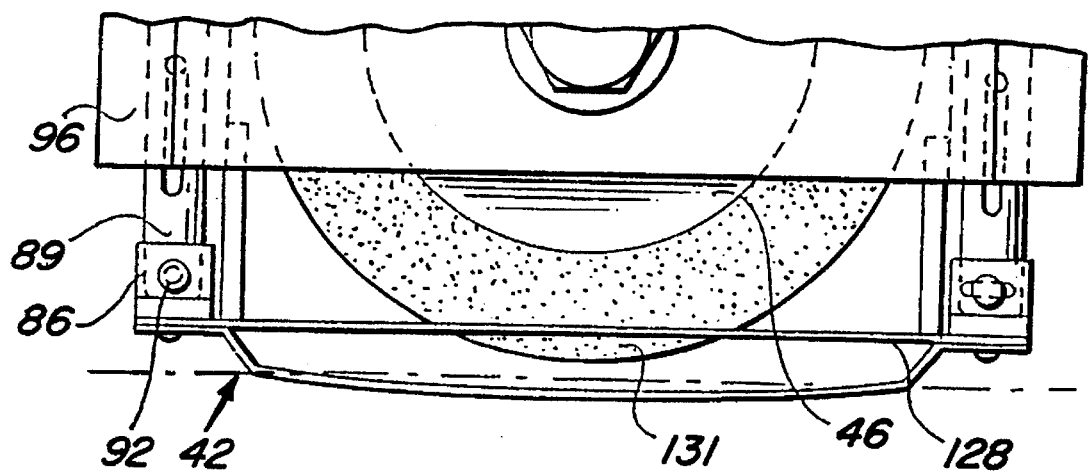
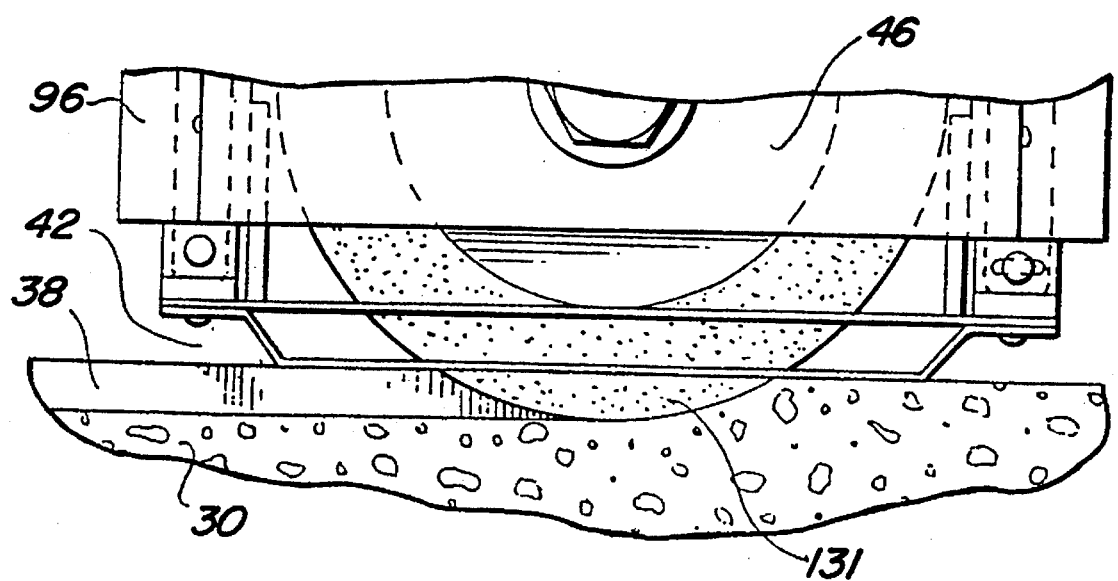
FIG. 10

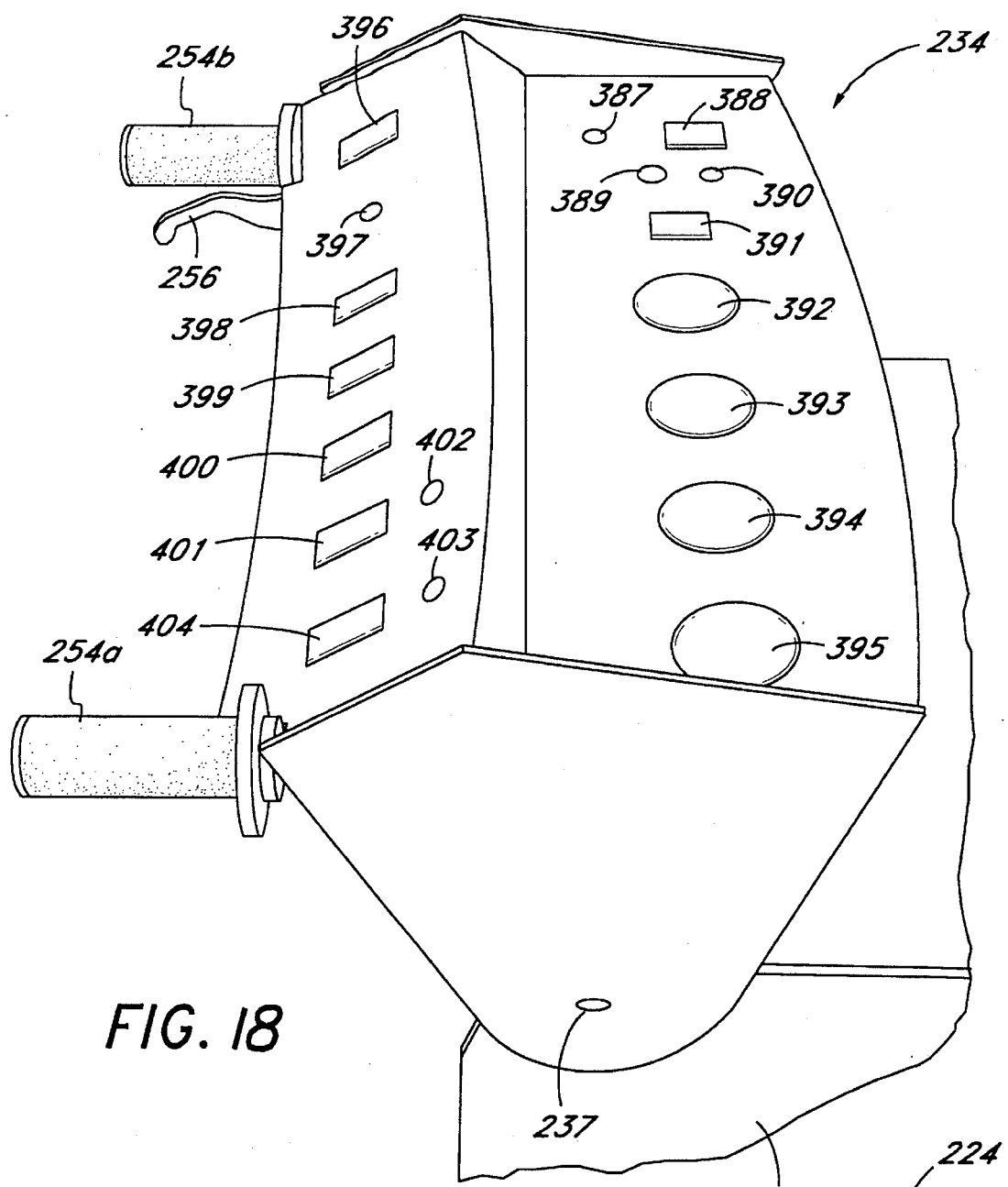
FIG. 18
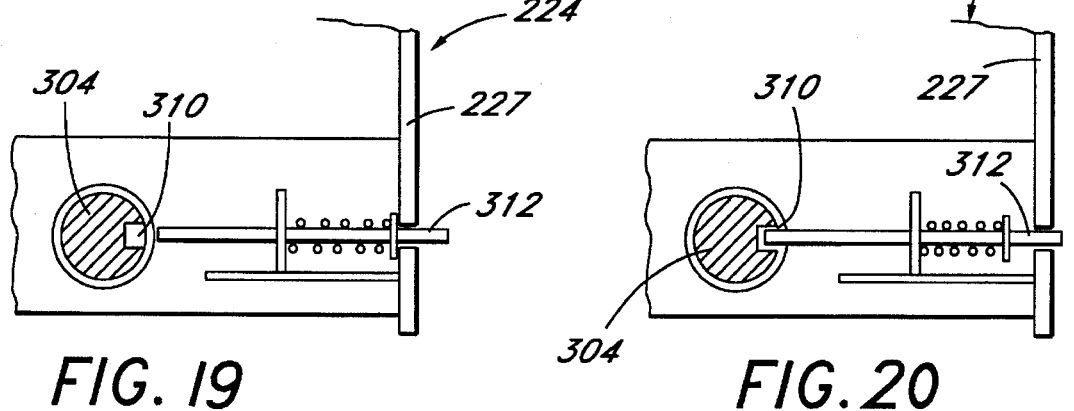
FIG. 19
FIG. 20

METHOD AND APPARATUS FOR CUTTING WET CONCRETE

This application is a continuation of U.S. application Ser. No. 08/017,140 filed on Feb. 12, 1993, U.S. Pat. No. 5,429,109, which is a continuation-in-part of application Ser. No. 07/837,248 filed on Feb. 14, 1992, U.S. Pat. No. 5,305,729, filed by Edward and Alan R. Chiuminatta.

BACKGROUND OF THE INVENTION

This invention relates to devices for cutting grooves in concrete. More particularly, this invention relates to concrete groove cutters which travel along the surface of wet or green concrete and use a rotating cutting blade to cut a groove into the surface of the concrete.

Concrete, when poured, is normally viscous, and thus flows and spreads to fill the area it is poured into. Once poured, the concrete will begin to harden in a curing process, until it reaches its typical rock hard state. Between the time the concrete is poured and when the concrete hardens, the concrete will normally be worked or finished to ensure that the surface is smooth and even or has some other discrete surface finish and appearance.

Normally, grooves are cut in the concrete to aid in relieving stresses in the concrete which occur as the concrete shrinks during curing. If grooves are placed only in the surface of the concrete, the grooves provide a weakened plane in which the concrete can crack, thus providing a predicted location of cracks. If the grooves are not provided, the concrete will randomly crack.

Grooves are also often inserted into the concrete surface after it has hardened substantially. This is normally accomplished with large concrete cutting devices which use heavy saws with rotating abrasive blades, and which use water as a coolant to prevent the blade from burning up. These devices are typically very large and heavy, and use large diameter cutting blades varying from 10 to 24 inches in diameter. The resistance on the large blades is so great that the saw will cut a curved path. Sometimes the blade is angled slightly about a vertical axis to cause the saw to cut in a straighter line. Other saws cannot be used until the concrete has hardened substantially, otherwise the finish of the concrete will be marred, the water lubricant will wash the concrete away, and the cutting blade will spall, chip, tear, crack and ravel (hereinafter the term "ravel" or "ravelling" shall include ravelling, chipping, tearing, cracking and spalling) the concrete surface along the groove. The large water lubricated cutting machines which cut the concrete surface after it has substantially hardened often groove the surface after the concrete has experienced significant stresses and cracking. These large machines will also often ravel the surface adjacent the groove.

Several light weight concrete cutting machines have been developed to cut concrete while it is still curing. To reduce the possibility of marring the surface of the wet concrete, these concrete saws have typically been very light weight and use no water lubricant. As a result, they have sacrificed durability. Namely, these saws typically are not heavy duty enough to withstand the rigors of extended use for many hours a day, day after day, for extended periods of time. These saws have typically been of the size that can be hand held, and utilize small motors turning small cutting blades of 4 to 6 inches in diameter which wear quickly. Such saws are described in U.S. Pat. No. 4,869,201.

Therefore there exists a need for a concrete cutting saw which can cut grooves without ravelling in concrete which has not substantially cured so as to incur cracking, and yet which is substantial enough to withstand the rigors of extended use.

SUMMARY OF THE INVENTION

The present invention uses a concrete cutting saw having a circular concrete cutting blade, a floating skid plate to prevent raveling of grooves cut in wet concrete, and advantageously uses two sets of supporting wheels. The saw is advantageously used to cut grooves in concrete after the concrete is finished and before it has reached its rock like hardness, and preferably before the concrete has shrunk sufficiently to cause cracking along planes other than those planes defined by the cut grooves.

The invention comprises a method and apparatus for cutting concrete with a concrete saw which cuts grooves in a concrete surface with a rotating cutting blade which rotates about a first axis as the saw traverses a portion of the concrete surface to cut the groove. The cutting blade is rotated in the surface of the concrete to cut a groove. The saw is movably supported on the surface of the concrete during cutting by a plurality of wheels. A slotted skid plate is depended from the saw to support the concrete surface adjacent the cutting blade during cutting, the rotating cutting blade extending through the slot to cut the concrete, the slot being configured relative to the cutting blade to inhibit raveling of the concrete surface during cutting. The skid plate is movably mounted relative to the saw so that the skid plate can remain in supporting contact with the concrete surface during cutting, while even though the saw tilts away from the concrete. The skid plate is resiliently urged against the concrete surface so that the skid plate maintains the support of the concrete surface along a sufficient portion of the cutting blade to inhibit raveling of the concrete surface adjacent the groove even when the cutting blade rises partially out of the concrete surface during cutting.

Advantageously, the skid plate is resiliently deformed to counteract any undesirable deformation of the skid plate as it is urged against the concrete surface so that the portion of the skid plate supporting the concrete surface to inhibit raveling remains substantially flat when the skid plate is urged against the concrete during cutting.

In a further embodiment, motor driven power is provided to at least one of the wheels to propel the saw across the concrete surface during cutting. A variable speed hydraulic transmission is placed in driving communication with the motor and at least one of the wheels. A sensor senses the relative movement between the skid plate and the cutting blade and provide an electrical signal responsive to that relative movement. The output of the variable speed hydraulic transmission is varied in response to the electric signal to control the rate at which the saw travels on the concrete during cutting. A second sensor in the form of a distance counter is mounted to the frame of the saw for measuring and displaying the distance the saw cuts the concrete.

In a further embodiment, the center of gravity of the saw is balanced substantially about the axle connecting two of the wheels supporting the saw, but slightly offset therefrom along the longitudinal axis of the saw by an amount sufficient to exert a predetermined force on the cutting blade to urge the blade into the concrete. In a further embodiment, the center of gravity of the saw is also offset so that the skid plate supports the concrete sufficient to prevent raveling of the cut groove, while not unacceptably marking the concrete surface. Advantageously, the pressure is less than one pound per square inch for that portion of the skid plate in contact with the concrete surface during cutting, when used to cut wet concrete.

In yet another embodiment, a rollable support, which is mounted to the saw, is resiliently urged against the concrete surface with a predetermined force during cutting to help stabilize the saw during cutting. In a still further embodiment, the slot in the skid plate has a uniform width adjacent the cutting edge of the blade during cutting, which slot width is between 1.0 to 1.3 times the thickness of the support portion which is adjacent the cutting edge of the blade during cutting.

In another embodiment, the cutting blade is mounted within a sound deadening enclosure comprising a blade housing and a number of shields and guards located about the skid plate to substantially enclose the portion of the rotating cutting blade not engaged with the concrete during cutting.

These and other aspects of the invention will become apparent from a study of the following description in which reference is directed to the following drawings.

DESCRIPTION OF THE DRAWINGS

FIG. 2 is an exploded perspective view of the skid plate support.

FIG. 3 is a bottom perspective view of the skid plate.

FIG. 9 is a partial side view of the blade housing and skid plate showing the cutting blade just before it enters the concrete surface.

FIG. 10 is a partial side view of the blade housing and skid plate showing the cutting blade after it enters the concrete surface.

FIG. 18 is a perspective view of the control panel.

FIG. 19 is a partial side view showing the pin for engaging the cutting drive shaft of the alternate embodiment.

FIG. 20 is a partial side view showing the pin when engaging the cutting drive shaft of the alternate embodiment.

DESCRIPTION OF THE ILLUSTRATED EMBODIMENT

Figure 1:
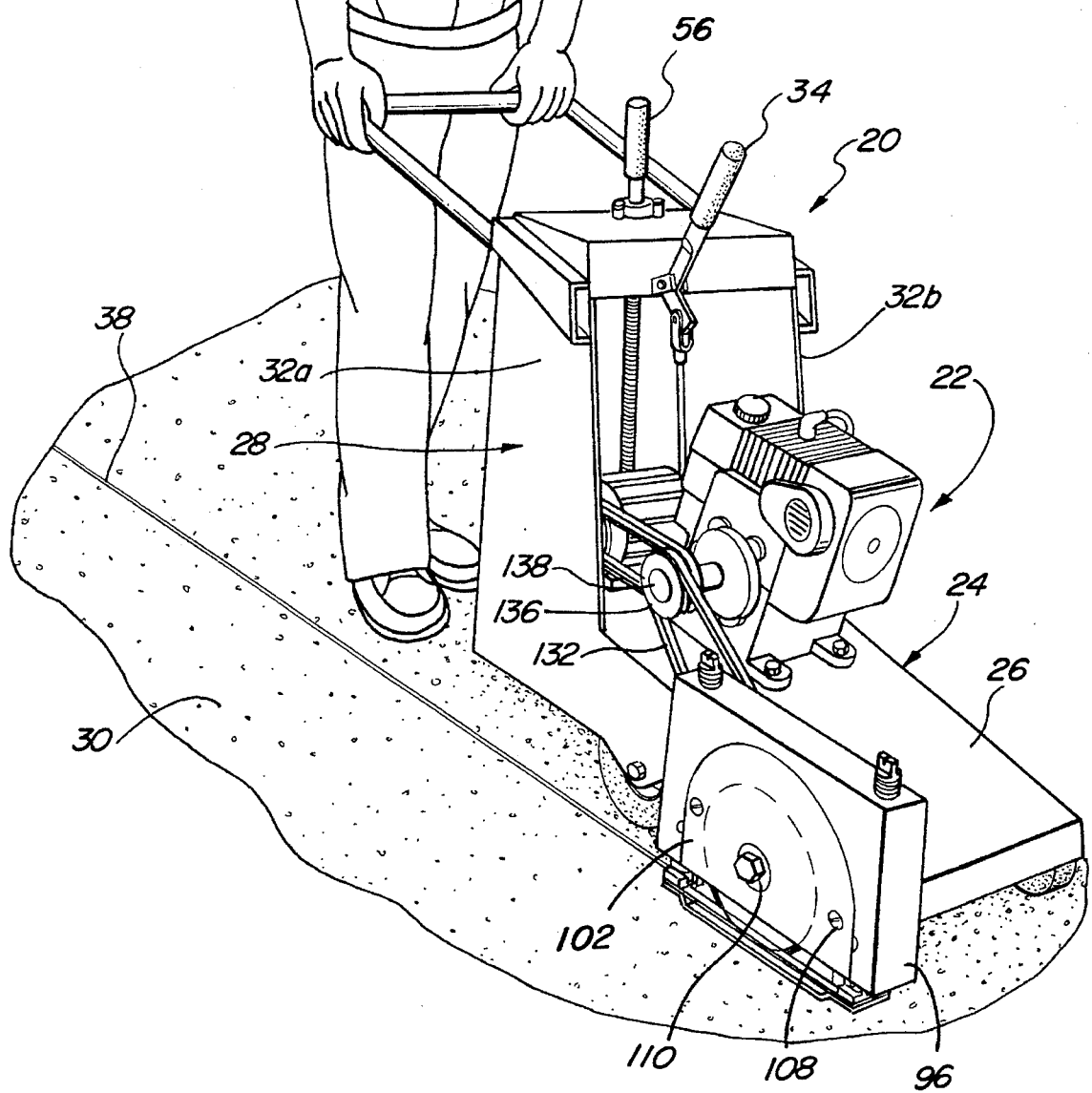
FIG. 1 is a perspective view of the concrete saw in operation.
Figure 4:
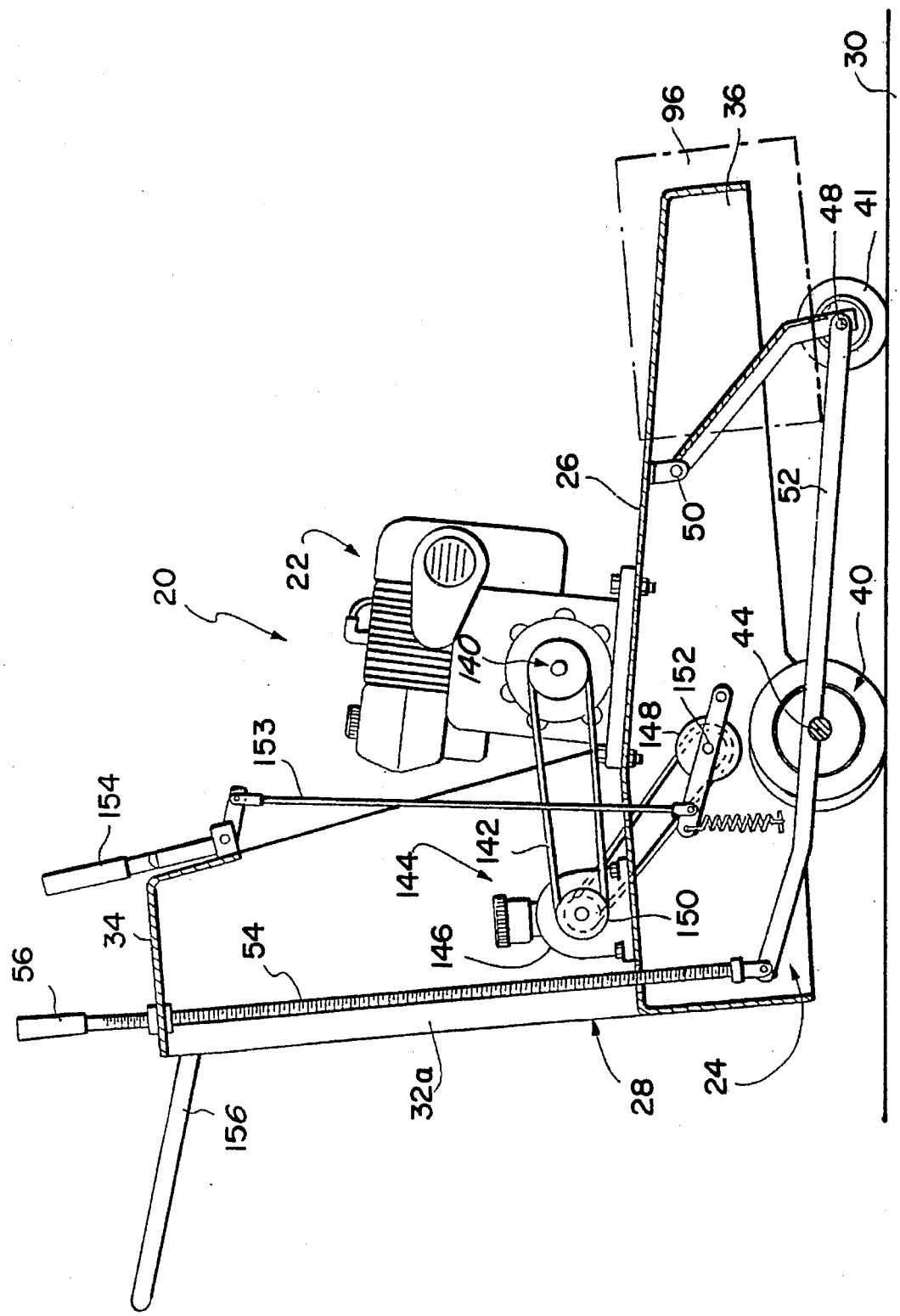
FIG. 4 is a side view of the concrete saw schematically illustrating the drive mechanism and the various wheels.
Figure 11:
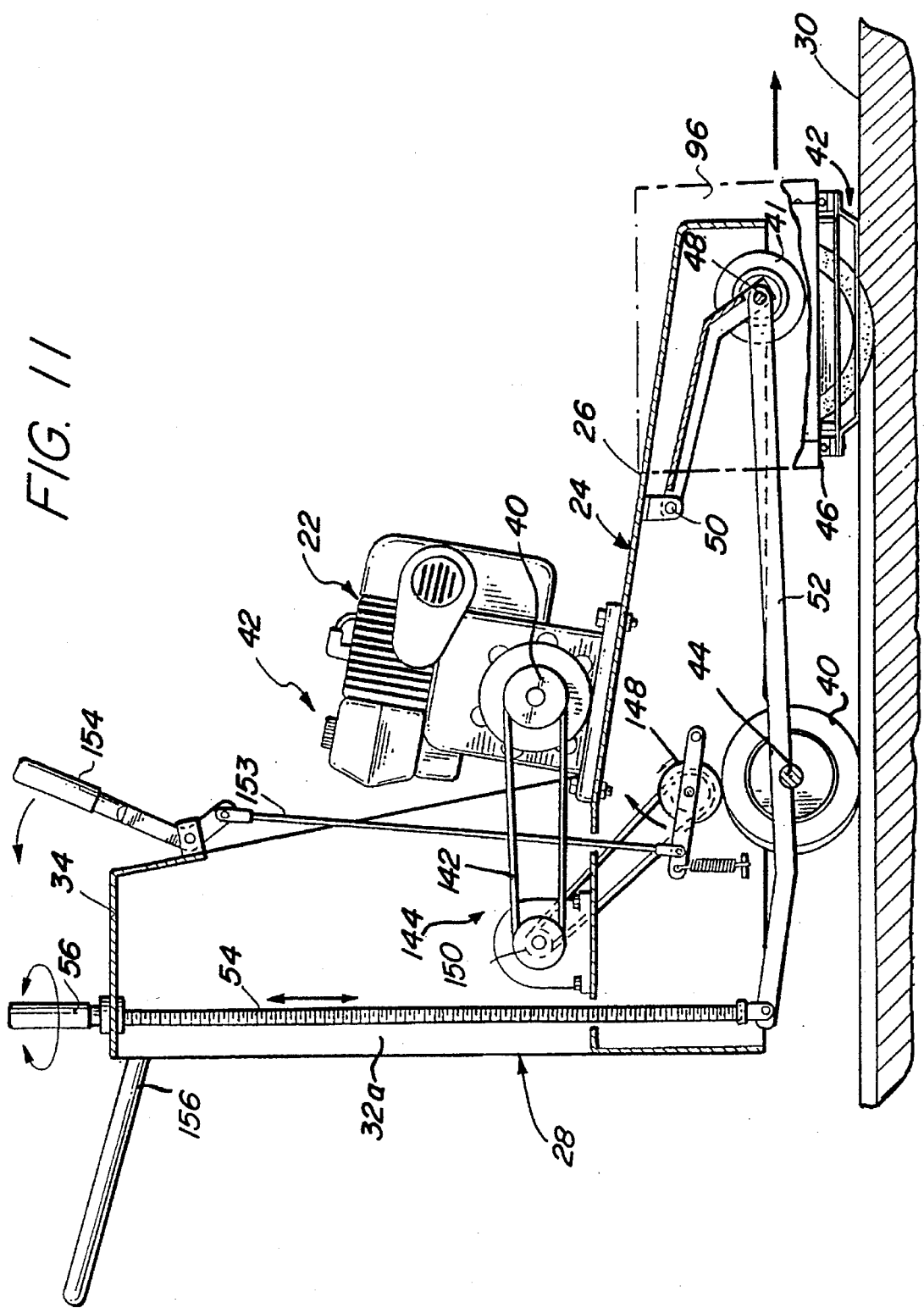
FIG. 11 is a side view of the concrete saw schematically illustrating the position of the saw when being driven forward and cutting a groove.

As shown in FIGS. 1, 4 and 11, there is a concrete saw 20 for cutting a groove 38 in a concrete surface 30 in accordance with one aspect of the invention. This concrete saw 20 is designed to be lightweight, and uses a large diameter cutting blade 46, having a diameter of 8–14 inches (20–35 cm), although smaller blades of 4–6 inches in diameter (10–15 cm) may be used. In general this concrete saw 20 is comprised of a motor 22 mounted on a frame 24 and driving a cutting blade 46 which extends through a skid plate 42.

The frame 24 is a support structure which preferably has two main sections: a lower supporting surface 26 which is generally planar, and an upwardly extending supporting member 28. The lower supporting surface 26 is a substantially rectangular plate generally parallel to the concrete surface 30. The upwardly extending supporting member 28 comprises two generally parallel sides 32a, 32b which rise vertically from opposing sides of the lower supporting surface 26 and which meet at some distance above the lower supporting surface, to form an inverted "U" shaped structure. The top of the upwardly extending support member 28 comprises a wide flat surface which is used as a control panel 34.

The lower supporting surface 26 is substantially flat, and has depending sides 36 around the periphery of surface 26, which sides 36 depend towards the concrete surface 30. These sides 36 may be constructed by welding, stamping, or rolling, and serve to strengthen the support surface 26 while maintaining a light weight.

A first set of wheels 40 is attached to the concrete saw 20 near the longitudinal center of gravity of the frame 24, but towards the rear, or trailing end of the saw 20. The longitudinal axis of the saw 20 is generally parallel to the groove 38. A transverse axis is substantially perpendicular to the longitudinal axis and substantially parallel to the concrete surface 30. The first set of wheels 40 is connected to an axle 44 which passes through, and is rotatably mounted to, the sides 36 of the lower supporting surface 26. The axle 44 is substantially parallel to the transverse axis, with each of the wheels 40 being adjacent a side 36 to provide a widely spaced support for the saw 20. The axle 44 is mounted about 17 inches (43 cm) to the rear of the shaft on which the cutting blade 46 is mounted, as will be described later. This first set of wheels 40 is located between the sides 36 of the frame 24, so that both wheels track to one side of the groove 38 being cut in the concrete surface 30. In this manner, the first set of wheels 40 is a distance away from the groove 38 and therefore will not effect the groove 38 after it has been cut. The first set of wheels 40 is preferably of sufficient size that they will not irreparably mar the surface of the concrete 30 when the saw 20 is used to cut wet concrete.

The first set of wheels 40 is angled so that they do not travel exactly parallel to the cutting blade 46. Because the cutting blade 46 is located on one side of the cutting saw 20, cutting resistance on the blade will cause the concrete saw to travel along a path angling towards the side of the saw on which the cutting blade is mounted. In order to compensate for this resistance and get the saw 20 to travel in straight line, the first set of wheels 40 is angled so that they are not parallel to the cutting blade 46. The first set of wheels 40 point away from the cutting blade 46 a few degrees, and thus create a frictional resistance against the surface of the concrete 30 which acts opposite, and compensates for, the resistance of the cutting blade 46.

A second set of wheels 41 is attached to the frame 24 near the front or leading end of the saw 20, located on the opposite side of the center of gravity as the first set of wheels 40. The second set of wheels 41, like the first set of wheels 40, is located on one side of the groove 38 being cut, and therefore also will not interfere with the groove. The second set of wheels 41 is attached to a transversely oriented axle 48. Hinged levers 50 have one end rotatably mounted to the surface of the frame 24 facing the concrete surface 30, with a second end of levers 50 connected to the axle 48 so the axle and second set of wheels 41 can rotate on levers 50 toward and away from support surface 26 and the concrete surface 30.

The axle 48 is also connected to a first end of a longitudinally oriented lever bar 52 which rides over the rear axle 44. A second end of the lever bar 52 engages one end of a vertically oriented acme screw 54. The other end of the screw 54 is connected to a handle 56 located on the control panel 34. The acme screw 54 thus extends from the handle 56 downward through a bushing (not shown) in the lower supporting surface 26, and there engages the second end of the lever bar 52, which in turn is attached to the axle 48 on which the second set of wheels 41 is mounted.

Advantageously, the saw 20 is supported while cutting the groove 38 in the concrete surface 30 by the first set of wheels 40, and the skid plate 42 to provide a three-point support for the saw.

The second set of wheels 41 are placed into contact with the concrete surface 30 to provide support to the concrete surface 20 when it is desired that the skid plate 42 not rest on the surface of the concrete. The second set of wheels 41 is engaged, primarily during non-cutting or non-operation periods, as for example, when it is desired to roll the cutting saw 20 to and from various slabs of concrete, for unloading or loading the concrete saw, when the concrete saw is being maneuvered on a slab of concrete to align the concrete saw for cutting the groove 38, or when it is desired to change the cutting blade 46 or the skid plate 42. The second set of wheels 41 is raisable and lowerable by extending or retracting the acme screw 54 against the lever bar 52.

When the groove 38 is cut, the cutting saw 20 is aligned with the desired line to be cut, as delineated by a chalk line or other sighting and alignment means known in the art and not described in detail herein. The rotating cutting blade 46 is then lowered into the surface of the concrete 30. This is accomplished by turning the acme screw 54 so that its lower end pushes the second end of lever bar 52 toward the concrete surface 30. The bar 52 pivots about axle 44 causing its first end, and the axle 48 and front wheels 41 to move towards the support 26 and away from the concrete surface 30. This raises the second set of wheels 41 back under the frame 24, such that the leading end of the cutting saw 20 on which the skid plate 42 is mounted lowers towards the concrete surface 30 as the concrete saw pivots about the axle 44 on which the first set of wheels 40 are mounted, until the skid plate 42 rests on the concrete surface, after which the rotating blade 46 extends through the slot to cut the concrete. There is thus provided a lever arrangement for moving the second set of wheels 41 into contact with the concrete surface.

If the concrete is sufficiently wet when the groove 38 is cut, the edges of the groove will deform if the wheels 40 run over them, or if the skid plate 42 trowels over them. The skid plate 42 is attached to one side 36 of the frame 24 a sufficient distance away from the first set of wheels 40 so that the groove 38 is not overridden or damaged by the wheels 40. The skid plate 42 is designed to smoothly contact the surface of the concrete 30 and is therefore of sufficient width and length so as not to drag into the concrete surface 30 during cutting.

Figure 5:
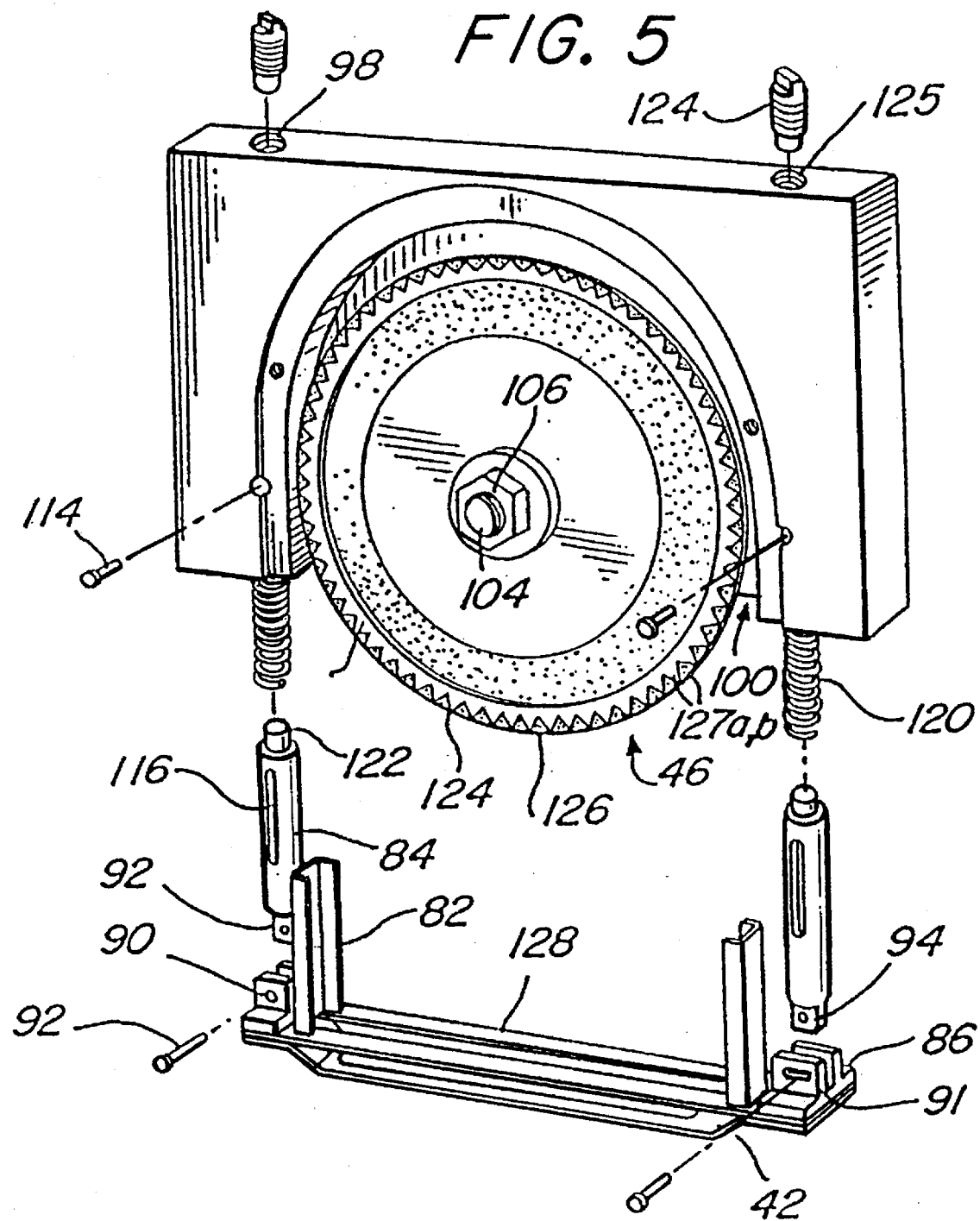
FIG. 5 is a cut away view of the blade housing, cutting blade, and skid plate with supports.

Referring to FIGS. 3 & 5, the skid plate 42 has a middle portion 60 which contacts the surface of the concrete 30 when the groove 38 is being cut. The skid plate 42 also has a leading edge 62 and a trailing edge 64 which are curved upwards and away from the middle portion 60, and thus away from the surface of the concrete 30. The leading and trailing edges 62 and 64 preferably re-curve into ends 66 which are flat and which extend substantially parallel to, but away from, the middle portion 60. The ends 66 of the skid plate 42 are offset vertically a distance away from the surface of the concrete 30, so that the middle portion 60 depends from the saw 20 a distance sufficient to contact the concrete surface 30 in order to support the concrete surface during cutting and inhibit ravelling of the concrete surface 30 adjacent the groove 38.

The skid plate 42 has a slot 68 which allows the cutting blade 46 to pass through the skid plate 42 into the surface of the concrete 30 (FIG. 10). This slot 68 is preferably located along a longitudinal axis 70 of the skid plate 42, which axis is generally parallel to the longitudinal axis of the saw 20. The slot 68 is centered in the middle portion 60, extending from a point just behind the leading edge 62 to a point near the beginning of the trailing edge 64. The slot 68 has a leading end 72 which is closed and terminates near the leading edge 62 of the skid plate 42. The slot 68 also has a trailing end 74 which is also closed and terminates near the trailing edge 64 of the skid plate 42.

The slot 68 has inner sides 76a, 76b which extend through the skid plate 42 to the bottom of the skid plate which faces and contacts the surface of the concrete 30. At a point near the trailing end 74 of the slot 68, a recess 78 extends into the bottom surface of the skid plate 42 and extends from the trailing end 74 of the slot 68 to the trailing edge 64 of the skid plate 42. The recess 78 about the trailing end 74 of the slot 68 prevents the skid plate 42 from trowling over the groove 38 which has been cut. Another form of recess, or tunnel, or even a skid plate 42 with an open trailing end, could also be designed to achieve a similar effect. The tunnel is described in U.S. Pat. No. 4,869,201, while the recess has been long used on the saws described in that patent.

The skid plate 42 has sides 80 which extend from the slot 68 outward. The sides 80 are preferably of such a width that when concrete is brought to the surface by the cutting blade 46 and is dislodged from such blade, it is deposited primarily on the surface of the sides 80 which faces towards the concrete saw 20. Advantageously, the sides 80 are wide enough that the removed concrete dries while on the sides 80 enough so that it does not re-adhere to the concrete surface being cut. This allows the concrete which is removed while cutting the groove 38 to be deposited back onto even a wet concrete surface 30 so that it does not become part of the wet concrete surface, but can be swept away at a later time.

Referring to FIGS. 1, 5, 9 & 10, the skid plate 42 acts as both a supporting member and a guiding member. The skid plate 42 can be formed from a substantially rectangular metal sheet, preferably of stainless steel, so that the skid plate will not wear at an excessive rate.

The skid plate 42 has a middle support portion 60 which is preferably about 9.5 inches (24 cm) long and 2 inches (5 cm) wide, for a total area of about 19 square inches. The skid plate 42 as illustrated is about 13 inches (33 cm) long from end to end. It has an area of about 19 square inches in contact with the concrete surface during cutting. While the thickness of the skid plate 42 may vary at its ends 66 as compared to its middle section 60, it is preferred to have a uniform thickness for the entire skid plate 42 for ease of manufacturing. Advantageously, the middle section is made of 12 gage stainless steel, which has a thickness of about 0.1046 inches (0.266 cm). This thickness correspondingly means that the slot 68 depth should also be 0.1046 inches.

Guards 82 extend between the skid plate 42 and the frame 26. The guards 82 are wide enough in dimension so that removed concrete which is dislodged from the cutting blade 46 and thrown therefrom is stopped by the guards 82. In this manner, concrete removed from the groove 38 by the cutting blade 46 is not thrown directly back onto the surface of the concrete 30.

The guards 82 may be of made of various material and shape, but as shown they are made of lightweight aluminum and are rectangular in shape. The guards 82 are as wide as the skid plate 42, and are advantageously curved inward at their outer edges to help deflect the concrete material inwardly onto the skid plate. The guards 82 may be mounted to the skid plate 42, but are preferably connected to the frame 26 so they need not be replaced as the skid plate wears and is replaced. The guards 82 may be attached to the skid plate 42 or frame 26 by welding, screws, bolts or the like, preferably at a point on the raised flat portions 66 of the skid plate 42.

Referring to FIGS. 2 & 5, the skid plate 42 is mounted at each of its ends 66 to a shaft 84 which is connected to a mounting member 86 on the skid plate 42. The mounting member 86 is rotatably connected to the ends 66 of the skid plate 42. These members 86 as illustrated are U shaped. The members 86 are mounted to the skid plate 42 with threaded fasteners 88 which pass through the members and into the skid plate. The fasteners 88 attaching the members 86 may also hold the concrete guards 82 in place if the guards 82 are connected to the skid plate 42.

The cylindrical shafts 84 have two parallel flat sides 94 at a first end which is nearest the skid plate 42. The flat sides 94 correspond to flat inner mounting faces of the mounting members 86. The mounting members 86 and flat sides 94 have holes 90 passing through them to accommodate pins 92 for securing the flat sides 94 of the shafts 84 to the mounting members 86. Pinning the ends of the shafts 84 to the mounting members 86 allows for rotation about a transverse axis of the skid plate 42 relative to the shafts 84.

Advantageously, one of the two members 86 has its hole 90 shaped in the form of a longitudinal slot 91 in which the pin 92 may slide generally parallel to the skid plate 42. The slotted hole 91 permits the skid plate 42 to move laterally to compensate for the distance change when the ends of the skid plate 42 move vertically relative to one another. It is desirable for the shafts 84 to be made from metal, so that they are resistant to abrasive forces, and so that they have sufficient strength to support the skid plate 42.

Referring to FIGS. 1, 2 & 5, the shafts 84 have second ends which extend into a rectangular blade housing 96 which is fastened to the saw 20 so as to enclose a portion of the cutting blade 46. The blade housing 96 has bores 98 aligned to accept the shafts 84 which support the skid plate 42. The blade housing 96 further has a semi-circular hollow section 100 for accepting the rotating cutting blade 46. A removable plate 102 is attached to the blade housing 96 on its side which faces away from the concrete saw 20. The plate 102 covers the hollow section 100 which houses the cutting blade 46, and allows complete access to one side of the blade 46.

The bores 98 extend vertically through the blade housing 96 and are located near the opposite ends of the generally rectangular housing, on opposite ends of the circular hollow section 100. These bores 98 are of a slightly larger diameter than the shafts 84, so as to slidably accommodate the shafts 84 therein.

Referring to FIGS. 2 & 5, a slot 116 is located along a portion of the length of each shaft 84. A rod 114 has one end fastened to the blade housing 96, with the other end passing through a bore 112 and into the slot 116 in the shaft. The rod 114 and slot 116 arrangement movably connect the shafts 84 in the bores 98 so that the shafts 84, and the attached skid plate 42 may not come free from the blade housing 96. The rod 114 and slot 116 arrangement allows the shafts 84 to move independently vertically to the extent each rod 114 travels in its corresponding slot 116. The length of the slot 116 determines the amount of movement of the shaft 84 and the corresponding end of the skid plate 42. The rods 114 serve as limit stops to limit the movement of the shafts 84 when the rods 114 hit the end of the slots 116.

A spring 120 is positioned inside of each bore 112 which houses the shafts 84. The springs 120 rest on a smaller cylindrical top end 122 of each shaft 84. An adjustment screw 124 is positioned above the spring 120 in each bore 98 at a point near the top of the blade housing 96, thus sandwiching the spring against the top end 122 of the shaft 84. The springs 120 are preferably coil springs so they can easily be inserted into the bores 98. The springs 120 are compressed into the bore 112 with the adjustment screw 124. This adjustment screw 124, as illustrated, is a threaded plug which engages the top portion of the bore 98, which has corresponding threads. The adjustment screw 124 may be advanced into the bore 112 to compress the spring 120 against the shaft 84 and vary the force with which the shaft 84 is angled downwards towards the surface of the concrete 30.

The compression of each of the springs 120 between the top end 122 of the shaft 84 and the adjustment screw 124 resiliently urges the shafts 84 away from the saw 20 and towards the surface of the concrete 30. The shafts 84 thus correspondingly force the skid plate 42 toward the surface of the concrete. This is necessary to assist in pressing the skid plate 42 against the concrete surface 30 with a predetermined force. The spring size and amount of compression can be used to vary the force.

The skid plate 42 as described is movably mounted relative to the concrete cutting saw 20. In this manner, the skid plate 42 may float relative to the saw 20 while maintaining support of the surface of the concrete 30 as the concrete saw 20 traverses the concrete surface during cutting, while providing a predetermined force on the skid plate 42 to support the concrete surface. This is important since the skid plate 42 acts as a support for the concrete surface 30 surrounding the groove 38 being cut. If the skid plate 42 is pressed against the concrete too hard it will unacceptably mark or damage the concrete surface 30. If insufficient support is provided to the concrete surface during cutting, the surface will ravel adjacent the groove 38.

As illustrated in FIG. 1, the blade housing 96 is mounted to the lower extending side 36 of the frame 24 at its front right hand corner. A motor drive shaft 104 (FIG. 5) passes through the side of the blade housing 96 nearest the frame 24. This shaft 104 is driven by the motor 22 to rotate the cutting blade 46. The shaft 104 terminates at a sufficient distance from the side of the removable plate 102 so that the cutting blade 46 and a locking nut 106 may be positioned thereon. Advantageously, the plate 102 has a circular hole 110 aligned with the shaft 104 to allow access to the nut 106 so as to remove the blade 46 without removing plate 102. The cutting blade 46 is thus mounted perpendicular to the cutting shaft 104, to cut the groove 38. The blade housing 96 also provides a safety shield to protect the user from flying particles dislodged by the cutting blade 46. The blade housing 96 may be made from any material, however, advantageously, steel or aluminum is used.

Referring to FIG. 1 & 5, the plate 102 which covers the circular hollow section 100 of the blade housing 96 is removable so that the inside of the circular hollow section 100 of the blade housing 96 may be accessed. This plate 102 may be attached in any manner, however, since it is preferable that the plate be easily removable, attachment by screws 108 or the like is suitable.

Because each of the two shafts 84 has its own independent adjustment screw 124, the compression of each spring 120 may be adjusted so that an individualized downward force may be applied to each of the shafts 84. Further individualized adjustments may be made by using stiffer or weaker springs 120. Locating the rods 114 at different positions in the housing 96 relative to the location of the slots 116 allows adjustment of the position of each end of the skid plate 42 relative to the blade housing 96. The rods 114 also act as limiting stops to limit the motion of the skid plate 42. These individualized adjustments permit the skid plate 42 to be adjusted so that the ends of the skid plate are at different vertical positions in relation to the concrete surface 30 when the skid plate is not in contact with the concrete surface, and allow adjustment of the force with which the skid plate 42 is urged against the concrete surface 30.

Referring to FIG. 11, when the second set of wheels 41 is raised, the saw 20 is supported by the rear wheels 40 and the skid plate 42. As the wheels 41 are raised, the saw 20 pivots about the rear axle 44, causing the skid plate 42 to approach the generally horizontal concrete surface 30 in an arc which will normally bring the rear of the skid plate 42 into contact with the surface 30 before the front of the skid plate 42 contacts that surface. It is preferred that when the skid plate 42 is lowered onto the concrete surface 30 that the trailing edge 64 of the skid plate 42 contact the surface of the concrete first, or alternatively, that the skid plate contact the surface in a completely horizontal fashion. Should the leading edge 62 of the skid plate 42 contact the concrete surface 30 first, the concrete surface will be gouged and torn by the leading edge of the skid plate as the cutting blade 46 is lowered.

In the concrete saw 20 as illustrated, the skid plate 42 is tilted so that the trailing edge 64 is closer to the surface of the concrete 30 than the leading edge 62 by having the slot 116 in the shaft 84 connected to the leading edge 62 be shorter than that in the shaft 84 connected to the trailing edge 64. Therefore, the skid plate 42 will be tilted so that the trailing edge 64 of the skid plate contacts the surface of the concrete 30 first when the cutting blade 46 is lowered. It is contemplated that if the skid plate 42 and blade 46 are completely vertically positionable, and do not pivot, then the skid plate 42 may be either tilted or may be horizontal with respect to the surface of the concrete 30.

It is also desirable for the skid plate 42 to be below the edge of the cutting blade 46 closest to the surface of the concrete 30 when the skid plate 42 is not engaging the surface of the concrete 30. In this manner, when the skid plate 42 is lowered so that the cutting blade 46 contacts the surface of the concrete 30, the skid plate will preferably be in contact with the surface of the concrete before the cutting blade 46. In this manner, the skid plate 42 is already supporting the surface of the concrete 30 around the area to be cut when the cutting begins, and the cut groove 38 will not ravel. Contact by the skid plate 42 prior to cutting may be accomplished by adjusting the length of the shafts 84 and adjusting the spring 120 compression so that when the skid plate 42 is not in contact with the surface of the concrete 30, the skid plate is not vertically as far from the concrete surface as the cutting blade 46.

Preferably the blade 46 cuts a groove 38 about 1.25 to 1.5 inches deep in concrete slabs over 6 inches (15 cm) thick, which is cutting less than the one-forth of the slab thickness as is recommended by the American Concrete Institute, and followed by lubricated concrete saws. Advantageously the 10 inch (25.4 cm) diameter cutting blade 46 extends into the surface of the concrete 30 approximately 1.1875 to 1.375 inches (3 to 3.5 cm) in depth. The exact depth at which the cutting blade 46 cuts, and hence the depth of the groove 38 being cut, depends on the force with which the blade 46 is urged against the concrete surface 30, and this force is resisted or reacted by the resiliently mounted skid plate 42 which is movably mounted relative to the blade 46 and saw 20.

The downward force exerted on the blade 46 is controlled by placing the center of gravity of the cutting saw 20 primarily about the first set of wheels 40. The center of gravity of the cutting saw 20 is slightly offset, however, so that approximately 8 to 10 pounds of force is exerted on the blade 46, which force is partially offset by the skid plate 42 pressing against the concrete. Thus, the weight of the saw 20 is balanced substantially over the rear axle 44, but offset by an amount sufficient to exert a predetermined force on the cutting blade 40 and skid plate 42.

The weight exerted by the skid plate 42 and blade 46 on the concrete may be adjusted, in one method, by mounting the motor 22 at a point nearly centered over the axle 44 of the first set of wheels 40 when the axle 44 is mounted toward the center of the frame 24. Alternatively, the adjustment may be made by mounting the first set of wheels 40 in a position nearer the rear of the frame 24 and away from the cutting blade 46, and then moving the motor 22 rear of the axle 44 on which these wheels turn.

As illustrated in FIGS. 1, 4 & 11, the motor 22 is mounted to the lower support surface 26 of the frame 24, preferably by bolting it to the frame. As stated earlier, in order to position the weight of the concrete saw 20 over the first set of wheels 40 such that the desired force is exerted on the skid plate 42, the motor 22 should be mounted such that its mass is primarily centered about the axle 44 supporting the first set of wheels 40. The exact location of the motor 22 is subject to manipulation depending on the exact weight and positioning of the rest of the saw structure, including the first set of wheels 40 on its axle 44.

The motor 22 is the power source which rotates the cutting blade 46 and drives the concrete saw 20. This motor 22 may be of any type. A gasoline-powered, Briggs & Stratton 9-horsepower motor with a 3600 RPM maximum speed is believed suitable. The saw 20 is balanced with the gas tank half full to average the effect of the weight of the gas on the balance of the saw 20.

The motor 22 may be slidably mounted so that it may be moved relative to the axle 44, or alternatively, the axle 44 may be positionable so that it may be moved with respect to the frame 24.

As illustrated, the majority of the weight of the cutting saw 20 is balanced about the rear axle 44 of the saw 20. The weight that balanced about the axle 44 is used to exert then a predetermined force on the second set of wheels 41 (when the saw 20 is not cutting), or on the skid plate 42 and blade 46 (when the saw 20 is cutting). The relatively low force on the skid plate 42, e.g. about 1 psi or less for wet concrete, helps prevent the skid plate from sinking into wet concrete or digging or disrupting the concrete surface 30. This weight distribution and the independent movement of the skid plate 42 with the moveable shafts 84 allows the cutting blade 46 to move upwardly, away from the concrete surface 30 if the blade 46 hits some large aggregate, while the skid plate 42 maintains contact with the concrete surface 30 to inhibit ravelling.

Ordinary concrete cutting operations using water lubricated saws accomplish concrete cutting by cutting the concrete when hard in order to prevent ravelling. The water lubricated saws utilize heavy downward forces on the cutting blade, often in excess of 100 pounds, as well as a high horsepower motor to drive the blade. When the concrete 30 is cut wet, as is desirable when using this cutting saw 20 to inhibit cracks, aggregate in the concrete may be disrupted by the cutting blade 46 and be pushed away, thus destroying the uniformity of the concrete and resulting in early concrete ravelling. However, if the cutting blade 46 is allowed to move slightly away from the aggregate so as to lessen the initial impact from the first contact with the aggregate, this is greatly reduced. It is believed that the resulting groove 38 cut in wet concrete, even though not as deep as required for conventional hard cutting saws, will still cause proper crack growth. A cutting depth of 1.25 to 1.5 inches (3.18 to 3.81 cm) is believed to be advantageous with concrete having aggregate having up to 2 inches (5.08 cm) in diameter, and over 5 inches (12.7 cm) thick. A nominal cutting depth of 1.1875 inches, which is below the above range, is also believed suitable, with the depth varying 0.25 inches less with blade wear and movement.

Figure 6:
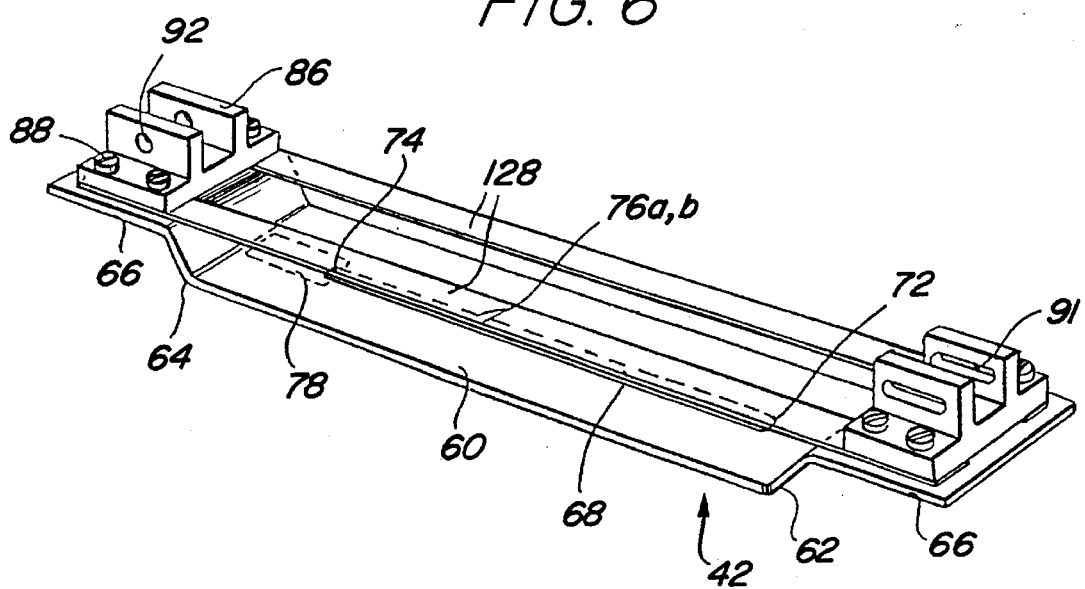
FIG. 6 is a perspective view of the skid plate, concrete guards, load bearing members, and mounting members.

Referring to FIGS. 5 & 6, two thin load bearing members 128 in the form of steel straps approximately 0.5 inch (1.3 cm) wide, and 0.060 inches thick, extend between the two ends 66 of the skid plate 42. These load bearing members 128 are located one on each side of the cutting blade 46. The load bearing members 128 are in tension, so that they pull the ends 62, 64 towards one another and slightly bow the middle portion 60 away from the saw 20 and toward the concrete surface 30. The members 128 constrain the skid plate 42 in this bowed configuration, and may also be referred to as constraining members. Depending on the orientation of the ends 62, 64, the members 128 may bow the skid plate 42 outward toward the concrete, or inward away from the concrete.

It is believed possible that the load bearing members may be made from a strip of aluminum 0.060 inches thick, with a center portion stamped out to leave two longitudinal straps or members 128 which are 0.25 inches wide, and joined at the ends by unstamped metal. Holes can be punched in the end pieces to allow passage of fasteners and pins as needed to connect the members 128 to the ends 62, 64. This aluminum version provides for fewer pieces and easier manufacturing. While the metal is softer than the steel version, it has a relatively short use life as it need only last until the skid plate wears out and needs to be replaced, at which time the members 128 can also be replaced, preferably as an entire assembly with the skid plate 42.

The load bearing members 128 prevent bowing of the skid plate 42 during cutting. The larger 10 inch (25.4 cm) diameter blade 46 requires a longer skid plate 42 to support the concrete during cutting to prevent ravelling, while the support along the blade 46 may be limited to the cutting edge, the support advantageously extends along the full length of the blade 46. Because the skid plate has ends 66 which are vertically offset from the middle portion 60 of the skid plate which rests on the concrete surface 30, and because the skid plate is relatively thin, the skid plate bows away from the concrete at its middle portion 60 when the cutting blade 46 is urged against the concrete by springs 120 and members 88. To remedy this problem, the load bearing members 128 are used to prevent bowing of the skid plate 42 away from the concrete surface 30.

The load bearing members 128 should be of such a length that when the skid plate 42 is not in contact with the surface of the concrete 30, the skid plate bows outward, or downward towards the surface of the concrete 30, and when the skid plate is in contact with the surface of the concrete 30, the skid plate is substantially flat. The amount of bowing caused by the load bearing members 128 is offset by the bowing caused by springs 120 and members 88. These load bearing members 128 may be of any type, such as wire, flat strips, shafts, or the like. The load bearing members 128 may be attached to the ends 66 of the skid plate 42 by welding, bolting, or other means known in the art. In the illustrated embodiment pins are placed in the ends 66. Holes are placed in the ends of the load bearing members 128, but the distance between the holes is slightly smaller than the distance between the pins, so that the skid plate 42 bows slightly when the load bearing members are installed. If the skid plate 42 were mounted so that the middle portion 60 bowed toward the concrete during cutting, then the direction of the initial bowing by the load bearing members 128 would be reversed.

Figure 8:
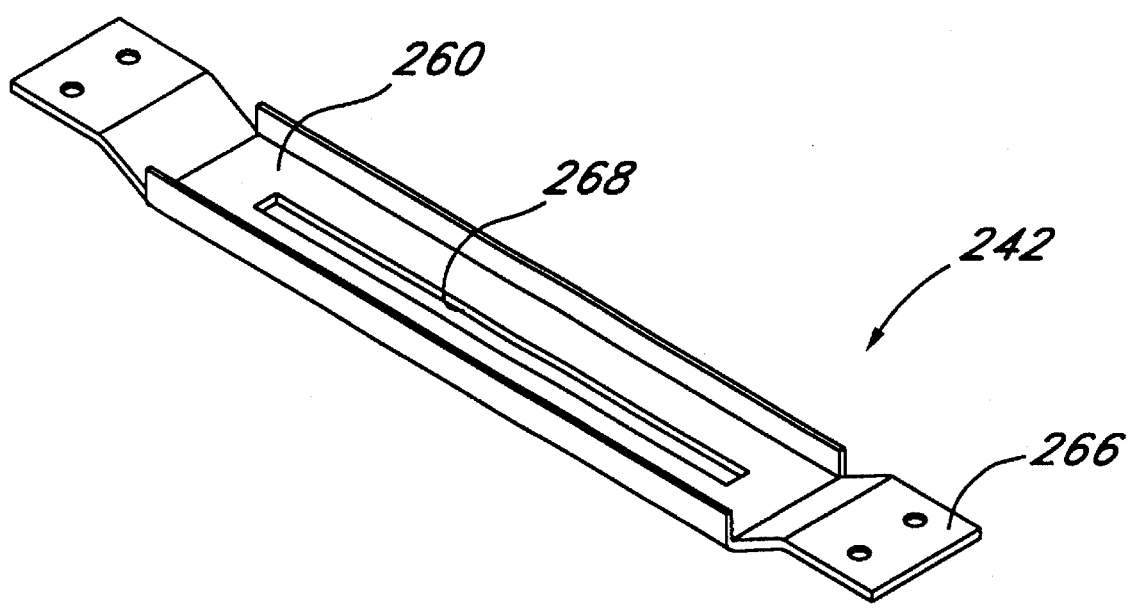
FIG. 8 is a perspective view of the skid plate showing an alternate method of preventing the skid plate from bowing.

Alternately, to prevent bowing, the skid plate 42 may be prestressed or bent such that it naturally bows towards the concrete surface 30 when the skid plate is not in contact with the surface of the concrete, and so that when the skid plate 42 is in contact with the surface of the concrete, the skid plate is flat. The bow should thus have an apex in the middle portion 60 of the skid plate. It is also believed possible that the skid plate 42 could be stiffened to resist bowing, as, for example, by having the edges of portion 60 bent upwards or by placing ribs thereon, as shown in FIG. 8.

Figure 7:
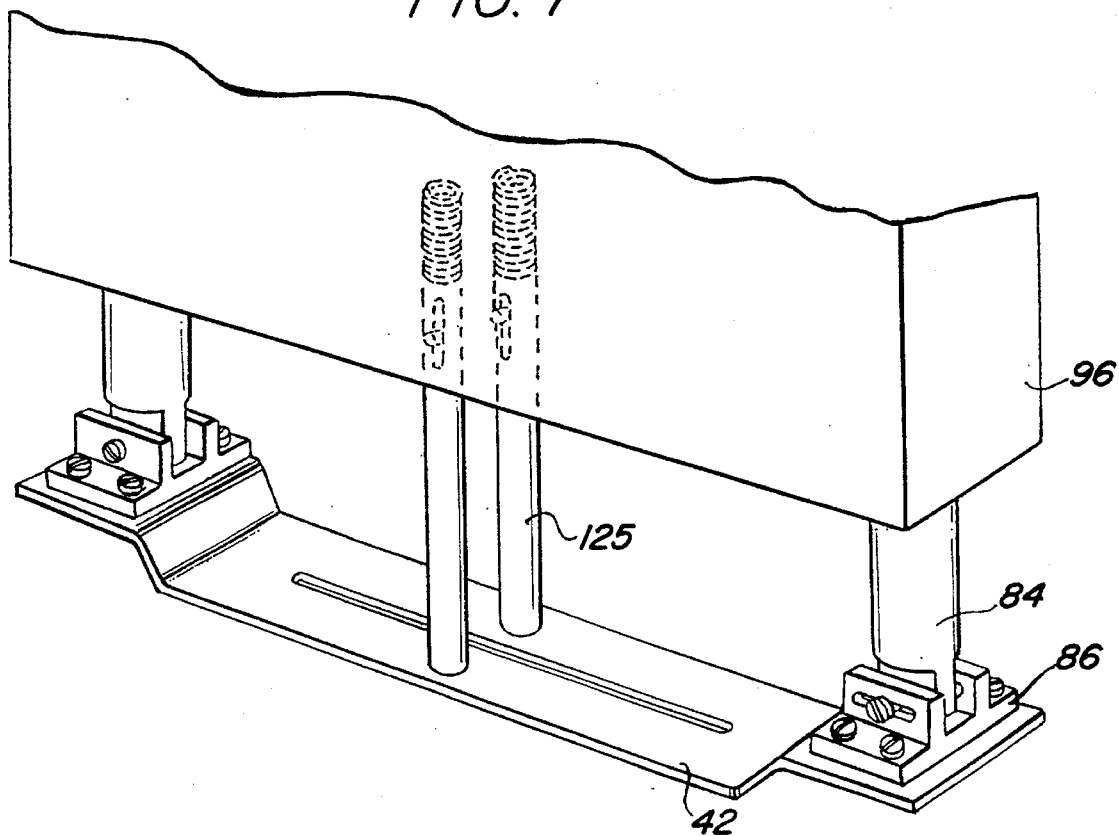
FIG. 7 is a perspective view of the skid plate showing the alternate method of preventing the skid plate from bowing.

Referring to FIG. 7, an alternate embodiment is shown in which pegs 125 are used to prevent bowing. One end of the pegs 125 may be resiliently mounted to the blade housing 96, with the other end of the pegs 125 engaging the sides 80 of the skid plate 42 at a point near the center of the skid plate 42. The skid plate 42, when loaded, is prevented from bowing at its center due to the resilient support of the pegs 125. The resilient mounting is achieved by spring loaded shafts analogous to members 88 and springs 120.

Referring to FIG. 5, the cutting blade 46 is a circular thin blade which has two flat sides 127a, 127b, a leading cutting edge 126, and a trailing edge 129. The blade 46 rotates in an up-cut rotation so that the leading cutting edge rotates out of the concrete surface 30 toward the front or leading end of the saw 20. The cutting blade 46 may be solid, or as shown, have a center section to which is mounted outer cutting segments 131. The cutting segments 131 have teeth with slots between them so that concrete material may be carried to the surface. The cutting segments 131 are typically made from carborundum or a diamond impregnated matrix.

Referring to FIGS. 1, 4 & 11, the cutting blade 46 is mounted to the rotating cutting shaft 104 which passes into the blade housing 96. In the illustrated embodiment, the cutting shaft 104 is transversely mounted. In the surface of the lower support section 26 of the frame 24, is an opening (not shown) for a belt 132. The belt 132 is connected to a pulley (not shown) fixed to the cutting shaft 104 and to a pulley 136 on the drive shaft of the motor 22.

The counterclockwise motion of the cutting blade 46 is such that the leading cutting edge 126 of the cutting blade moves out of the surface of the concrete 30. In other words, the cutting blade 46 moves so as to impede the motion of the concrete saw 20 in its forward direction. In this manner, the cutting blade 46 removes concrete and brings it to the surface in the slots in the cutting segments 131, where it is deposited onto the sides 36 of the skid plate 42. The surface of the concrete 30 around the groove 38 being cut is protected from ravelling through the support of the skid plate 42 which surrounds at least the leading cutting edge 126 of the cutting blade 46 and supports the surface of the concrete 30.

The crank shaft 138 of the motor 22 has mounted to it pulleys 136 and 140. One pulley 136 is connected to belt 132 which drives the cutting shaft 104 and the cutting blade 46. The other pulley 140 is connected to a belt 142 which is connected to a saw drive mechanism 144.

The drive mechanism 144 comprises a pulley driven transmission 146 and drive wheels 148 which rotate the first set of wheels 40. The pulley 140 on the motor 22 rotates the belt 142 which is connected to a pulley 150 mounted on the transmission 146. This transmission 146 reduces the rotational speed of the belt 142 and then transfers the power to an axle 152. The axle 152 has drive wheels 148 mounted on it. These drive wheels 148 are mounted so as to selectably contact the first set of wheels 40. The drive mechanism 144 is pivotably connected to the concrete saw 20 and connected by a rod 153 to a lever 154 which is located on the control panel 34. The user may disengage the drive mechanism 144 by pulling up on the lever 154, which lifts the drive wheels 148 out of contact with the first set of wheels 40.

The cutting saw 20 may thus either be pushed by the user, or alternatively be self driven by motor 22. It is preferred that the user allow the self drive mechanism 144 to drive the cutting saw 20, for the drive mechanism drives the saw at a more uniform rate, which in turn cause less variation in the cut groove 38.

A handle 156 is attached to the upper extending support member 28. The handle 156 is a tubular section of metal formed into a "U" shape and connected at its free ends to the upper support frame 28. The handle 156 may be provided with a cushion (not shown) for comfortable pushing. The handle 156 is used by the operator to guide the cutting saw 20 so as to maintain the cutting line on which the saw is operating, and if the drive mechanism 144 is disengaged, is used to push the concrete saw 20.

In operation, the motor 22 on the concrete saw 20 is started, and the cutting blade 46 begins to turn. The cutting blade 46 is lowered towards the surface of the concrete 30 by retracting the second set of wheels 41. The skid plate 42 will contact the surface of the concrete 30 at either its trailing edge 64, or flat with the surface. After the skid plate 42 is on the surface of the concrete, the cutting blade 46 will be lowered through the slot 68 of the skid plate 42 into the concrete surface 30. The cutting blade 46 is lowered to its lowest point, that being where the cutting blade engages the surface of the concrete 30 to a depth of about 1.25 to 1.375 inches (3.2 to 3.5 cm). The drive mechanism 144 is then preferably engaged, and the concrete saw 20, under the guidance of the operator, begins moving and cutting the groove 38.

In a normal cutting operation for wet concrete, a cutting blade 46 of about 10 inches (25.4 cm) in diameter with a cutting segment 131 about 0.09 inch (0.29 cm) wide is believed to be suitable. The cutting blade 46 should be flat so that it does not wobble. The width of the cutting segment 131 is selected so that the cutting blade 46 provides a groove 38 width sufficient to relieve concrete stress and provide the necessary concrete crack initiator.

Larger diameter concrete cutting blades tend to wobble more than smaller blades. As the spacing between the slot and the cutting blade affects the quality of the cut groove, the amount of wobble of the concrete blades becomes important for the first time. The cutting blade 46 may not be rotatably mounted exactly perpendicular to the surface of the concrete 30, and the cutting blade may not be perfectly flat, thus causing the cutting segment to wobble, and requiring more restrictive dimensional tolerances than have been previously needed for concrete cutting. If the wobble becomes too great, the cutting segment 131 will abrade the sides 76a, 76b of the slot 68, and if the slot 68 is too wide, the quality of the groove 38 deteriorates. A runout tolerance of about 0.001 inches on the flatteners of the blade 46 is believed advantageous. These tolerances are much less than that allowed in previous saws, as the use of a larger diameter cutting blade 46 necessitates closer tolerances to maintain good groove characteristics.

The cutting of the groove 238 by the concrete saw 220 preferably occurs within about two hours after pouring or at such time as the saw 220 can be moved across the concrete surface 220 without unacceptably marking the concrete surface 230. Because the concrete can be cut by the saw 20 while the concrete is still soft, the size of the slot 68 surrounding the cutting blade 46 must be designed to provide support to the concrete surface 30 surrounding the cutting blade sufficient to prevent ravelling of the groove 38. The width and length of the slot 68 in the skid plate 42 are important in determining the characteristics of the cut groove 38. It has been determined that too wide of a slot 68 will cause the concrete surrounding the cutting blade 46 to ravel thus causing the resulting groove 38 and surrounding concrete surface 30 to have unsatisfactory surface characteristics.

It is preferred that the slot 68 have a width such that the sides 76a, 76b of the slot are as close to the sides 127a, 127b of the cutting segment 131 of the cutting blade 46 as possible, without contact between the cutting segments 131 and slot sides. Since cutting blades 46 may not be perfectly planar on their sides, and due to the fact that cutting blades 46 tend to wobble, the slot 68 width advantageously is maintained uniformly close to the sides of the cutting segments 131. However, the slot 68 width must accommodate the inherent blade wobble and misalignments, and therefore the slot width must be somewhat larger than the width of the cutting blade 46. A slot width of about 0.118 to 0.120 inches (0.23–0.30 cm) is believed advantageous for the specified skid plate 42, although a slightly wider slot width of 0.13 inches (0.33 cm) is believed to perform satisfactorily while being slightly easier to manufacture.

Thus, for cutting wet concrete as described in U.S. Pat. No. 4,869,201, a satisfactory slot 68 is believed to have a space of about 0.020 inches (0.51 mm) from each of the sides of the cutting segments 131, such that the total slot width is around 0.13 inch (0.33 cm) for a cutting blade 46 with cutting segments 0.09 inches thick. This tolerance should be large enough to allow for variations in cutting blade 46, as well as adequately support the concrete surface 20 adjacent the cutting blade. The distance from the edges of slot 68 to the sides of the cutting blade 46 (which includes segments 31) are advantageously less than 0.125 inches for wet concrete. Spacings of 1/32 to 1/16 of an inch are more advantageous for wet concrete, and preferably as close as possible without hitting. This aspect is described in U.S. Pat. No. 4,869,201, and the specification of that patent is incorporated by reference. If the width of the slot 68 becomes wider than this range, the concrete surface 30 surrounding the groove 38 deteriorates. For cutting concrete harder than 1200 psi, a wider blade spacing may be used. The saw 20 is suitable for use in harder concrete, but if the concrete is too hard, then water lubrication must be used to prevent the blade 46 from overheating.

It is also desirable for the width of the slot 68 in the skid plate 42 to be between 1 and 1.25 times the thickness of the middle portion 80 of the skid plate 42 where the slot 68 is located. Preferably the skid plate 42 is 0.1046 inches (0.267 cm) thick at this middle portion 80. It is difficult to machine or to stamp a small width slot 68 in a skid plate 1 to 1.25 times as thick as the slot is wider. The preferred skid plate has the advantage of being capable of being made, while wearing out at about the same time as the blade 46. Therefore, the skid plate 42 and the cutting blade 46 may optimally be changed at the same time to minimize down time during which the saw 20 is not in use.

It is also desired that the slot 68 be of a length sufficient to surround at least the leading edge of the cutting segments 131. Advantageously, the slot 68 surrounds a substantial length of the cutting blade 46 in contact with the concrete surface 30, and preferably extends along the entire length of the blade 46 passing through the skid plate 42. However, once again, because of cutting blade 46 imperfections and movement of the blade 46 relative to the skid plate 42, a tolerance wherein the slot 68 extends on each end no more than 0.25 inch (0.64 cm) further than the cutting blade is acceptable. This 0.25 (0.64 cm) inch tolerance again will provide the necessary support of the concrete surface 30 before and after the blade trailing edge 129 and leading edge 126.

Referring to FIGS. 12–22, there is shown an improved, alternate embodiment of a concrete saw 220 for cutting a groove 238 in a concrete surface 230. This saw 220 is also designed to be lightweight, and advantageously uses a cutting blade 246 with diameters of 8–14 inches (20–35 cm), although smaller blades of 4–6 inches in diameter (10–15 cm) as used on many current wet cutting saws may also be used. Current water lubricated concrete cutting saws often uses cutting blades of about 24 inches (61 cm) in diameter. Such blades could be used on a saw 220 as generally described herein, if suitable adjustments were made to the various components given the disclosure herein. Preferably, however, a blade 246 with a diameter of about 10 inches (25 cm) is used.

In general, the concrete saw 220 is comprised of a motor 222 mounted on a frame 224 driving a cutting blade 246 which extends through a skid plate 242. The motor 222 is mounted to the frame 224 at a point just in front of the longitudinal center of gravity. The motor 222 may be mounted by bolting or welding it to the frame 224. The motor 222 is the power source which rotates the cutting blade 246 and drives the other components of the saw 220. This motor 222 may be of any type. A 9 h.p. Brigs & Stratton gasoline motor, having a maximum speed of 3600 r.p.m., is believed suitable.

The motor 222 speed may be monitored by a tachometer 395 which is mounted on a control panel 234 and the speed may be varied remotely by using a throttle cable 397 connected to the motor 222 and the control panel 234. The motor 222 may be remotely started by engaging a manual choke 387 connected to the motor 222 and by turning an ignition key switch 389 which is electrically connected to the motor 222, as would be apparent to one skilled in the art. An indicator light 390 may be provided to indicate that the motor 222 is running, and an hour meter 393 may be electrically connected to the indicator light 390 to measure and display the number of hours that the motor 222 has run. The light 390 and hour meter 393 may be electrically powered and connected to the motor 222, as would be apparent to one skilled in the art.

The frame 224 is a support structure having two main portions: a lower support surface 226 comprising a plate 223 connecting two beams 225, and sides 228, 229 which extend upwards from the lower support surface 226. The lower support surface 226 comprises mainly the rectangular plate 223 which is connected to the rectangular beam 225 on each side. The plate 223 is made of metal such as steel or aluminum. The metal beams 225 are mounted to the bottom of each side of the plate 223 and depend downwards.

The sides 228, 229 comprise two generally parallel plate members which rise vertically from opposite sides of the lower support surface 226. The sides 228, 229 may be made from steel, aluminum or other durable material which will support other saw 220 structures.

A metal face plate 227 connects the sides 228, 229 at their ends at the front of the saws 20.

A headlight 377 is mounted in a rectangular cut out in the face plate 227 for illuminating the concrete surface 230 in front of the saw 220. A side light 378 may be mounted in the side 229 just behind the point where the cutting blade 246 is mounted in order to illuminate the area about the groove 238 being cut. Both of the lights 377, 378 are connected by wires to a switch 399 and powered by a battery 405.

The top of the two sides 228, 229 are connected by a hood 382 which is hinged to the front of the frame 224. The hood 382 is thus pivotable about the front of the saw 220 and extends so as to cover the top, otherwise open, surface between the sides 228, 229. The hood 382 as shown is preferably made from metal, but could be made from a durable plastic. The hood 382 has a raised portion 383 which has openings at its end facing the rear of the saw 220 in order to provide additional air access to the inside of the saw 220. A linear actuator 384 (FIG. 13) is attached to the front of the hood 224 and the side (FIG. 12) 229 to open and close the hood 382. This actuator 384 is electrically powered, and is activated by engaging a two way toggle 388 which is connected to the actuator by electric wiring, as would be obvious to one skilled in the art.

A cover 385 is pivotably mounted to the sides 228, 229 at the rear end of the saw 220. The cover 385 is a thin plate of metal which extends from the bottom of the sides 228, 229 nearest the concrete, upwards to a control panel 234, which is described below. The sides 228, 229, hood 382, and cover 385 thus act to form an enclosure about the frame 224 on all but the side facing the surface of the concrete 230.

Figure 12:
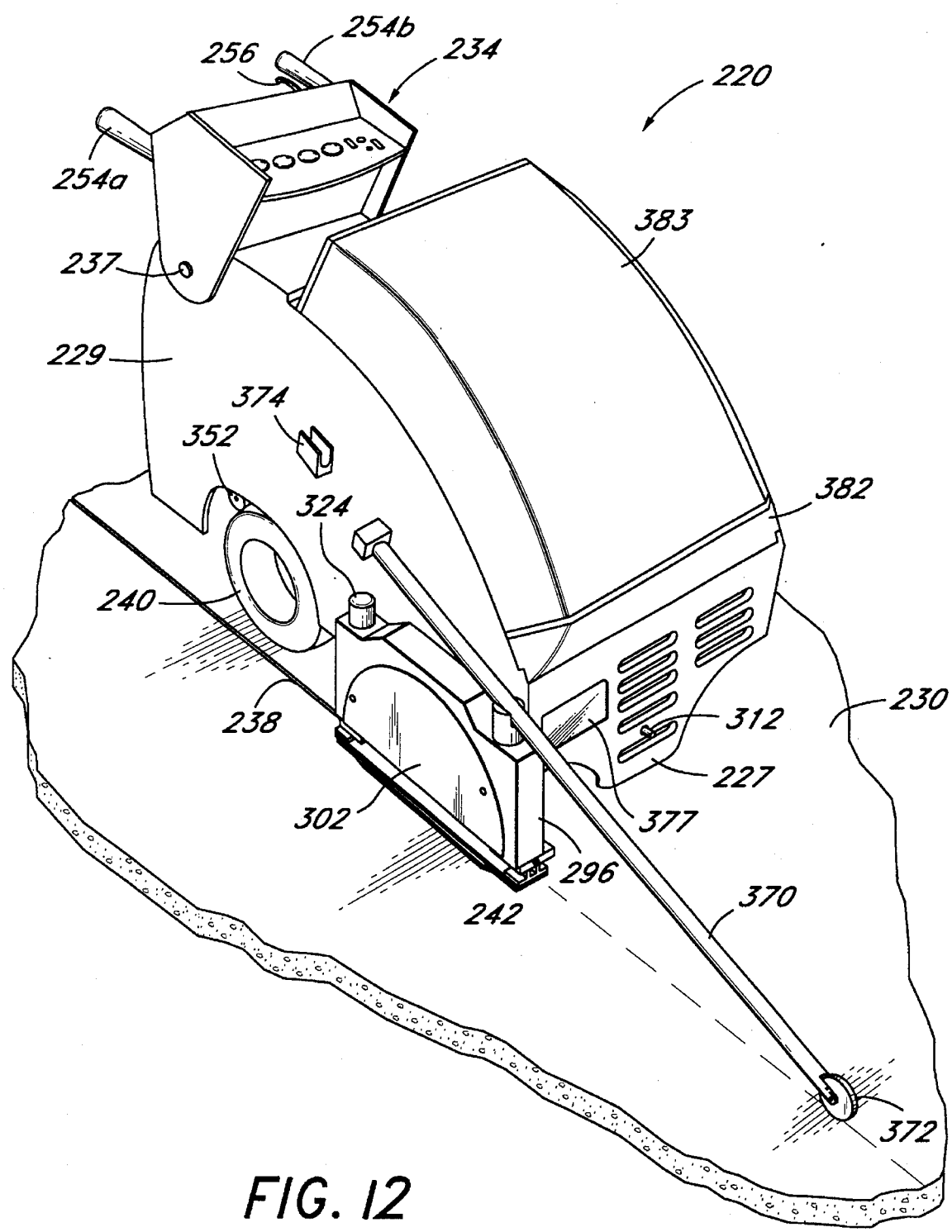
FIG. 12 is a perspective view of the alternate embodiment of the concrete saw.

As illustrated in FIG. 12, 14 & 15, an alignment guide 370 is mounted to the outside of the side 229 on which the groove 238 is being cut. The alignment guide 370 comprises a long column approximately 4 feet (1.2 m) long which is mounted pivotably to the side 229 of the saw 220. The alignment guide 370 has a roller sight 372 mounted on its free end. An actuator 376 is mounted to the pivot of the alignment guide 370 on the inside of the side 229 to provide powered rotation of the guide into a use or non-use position. This actuator 376 is electrically powered and is controlled from a toggle 396 mounted in the control panel 234 and which is connected to the actuator 376 by electric wiring, as would be obvious to one skilled in the art. A stop 374 is mounted on the outside of the side 229 to the rear of the pivot point of the guide 370 in order to limit the travel of the guide.

The control panel 234 is connected to the sides 228, 229 near the rear of the saw 220. The control panel 234 comprises an enclosure containing a plurality of gages and controls, including the manual choke 387, the hood actuator toggle 388, the ignition key switch 389, the indicator light 390, a clock on/off switch 391, a clock 392, the hour meter 393, an ampere meter 394, the tachometer 395, the guide arm actuator toggle 396, the throttle cable 397, a gear actuator 398, the headlight switch 399, a control panel actuator toggle 400, a second set of wheels actuator and drive toggle 401, a full depth cut light 402, a drive indicator light 403, and a transmission actuator toggle 404 (FIG. 18).

Figure 14:
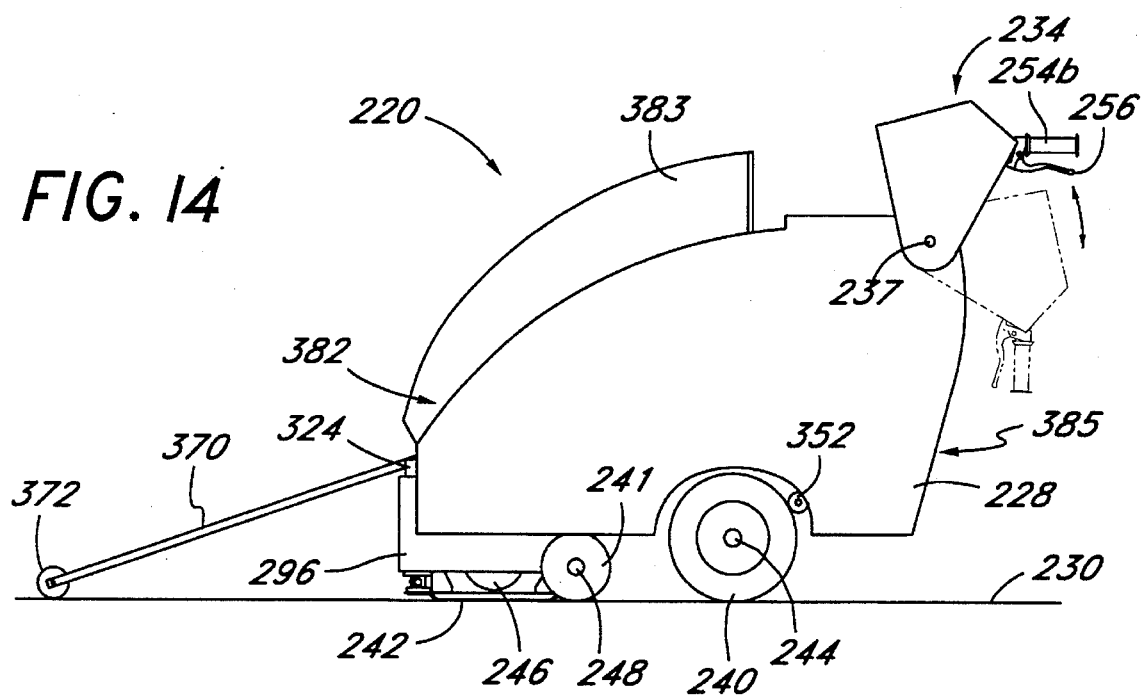
FIG. 14 is a side view of the alternate embodiment of the concrete saw.
Figure 15:
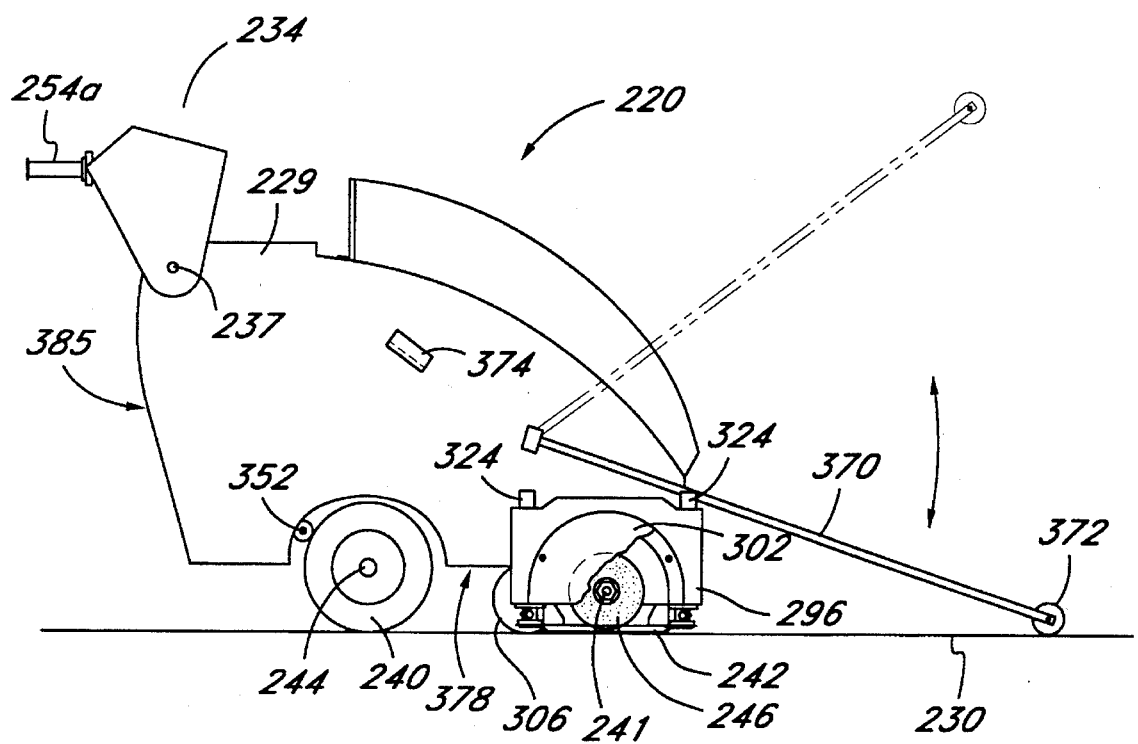
FIG. 15 is another side view of the alternate embodiment of the concrete saw.

The control panel 234 is pivotably connected to the saw 220 by pins 237 which pass through sides of the control panel 234 into the saw sides 228, 229 (FIG. 14). The rear of the control panel 234 is connected to the rear of the saw 220 with an actuator 239 so as to allow the control panel to be remotely pivotable. The actuator 239 is electrically powered and is activated by a two way toggle 400 on the control panel 234 which is connected to the actuator 239 by electric wiring.

Figure 13:
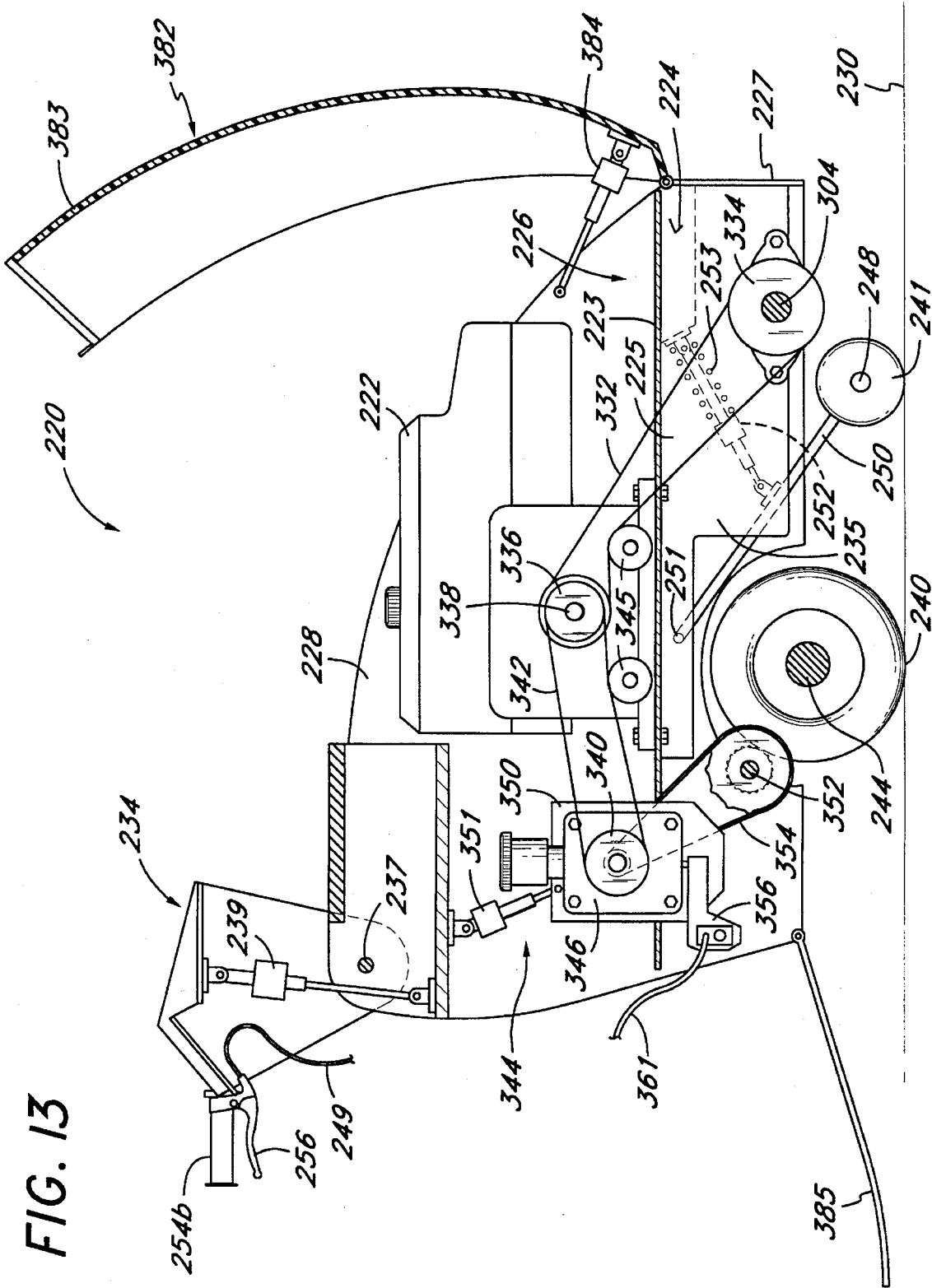
FIG. 13 is a side view of the alternate embodiment of the concrete saw schematically showing the two sets of wheels, transmission, motor, and control panel.

Handles 254*a*, *b* are mounted on each side of the control panel 234 at its rear side (FIG. 13). The handles 254*a*, *b* comprise cylindrical grips which extend from the control panel 234. The handle 254*a* on the side of the saw 220 on which the groove 238 is being cut may be rotated or twisted so as to actuate a cable. A squeeze grip 256, akin to a motorcycle hand clutch, is attached to the other handle 254*b*. The grip 256 can be closed against the handle 254*b* so as to pull an actuator 249 cable attached thereto.

A first set of wheels 240 is attached to the concrete saw 220 near the location of the center of gravity of the saw 224 along the longitudinal axis, but slightly offset towards the rear or trailing end of the saw 220. The longitudinal axis of the saw 220 is generally parallel to the groove 238. A transverse axis is substantially perpendicular to the longitudinal axis and substantially parallel to the concrete surface 230. The first set of wheels 240 is connected to a transverse axle 244 which passes through, and is rotatably mounted to, the beams 225 of the frame 224. The axle 244 is substantially parallel to the transverse axis, with each of the wheels 240 being adjacent a side 228, 229 to provide a widely spaced support for the saw 220. The axle 244 is located about 18 inches (46 cm) rear of the shaft on which the cutting blade 246 is mounted, as is described later. The first set of wheels 240 is located between the sides 228, 229 of the frame 224, and preferably both wheels track to one side of the groove 238 being cut.

Each of the wheels in the first set of wheels 240 preferably has a smooth tread pneumatic tire 10 inches (25.4 cm) in diameter and 4 inches (10.2 cm) in contact width, thus providing a wide contact area with the concrete 230. Ideally the wheels 240 are advantageously sized so that they do not unacceptably deform the concrete even when the saw 220 is used to cut wet concrete. Advantageously the wheels are selected so that the saw 220 does not permanently mark the concrete surface 230 with indentations greater than $\frac{1}{16}$ inch in depth in road paving applications, although in residential or commercial applications any visibly perceptible deformation is undesirable and often acceptable, when used to cut concrete having a hardness such that a steel rod weighing about 5.75 pounds, having a diameter of 1.125 inches, when dropped from a height of about 24 inches from the surface of the concrete makes an indentation of about $\frac{1}{32}$ of an inch or less with a flat end of the rod, although when cutting concrete for certain residential or commercial applications any visible deformation of the concrete surface is undesirable. If the saw 220 is used to cut harder concrete, the wheels may be smaller and harder as the harder concrete is less prone to damage than the wet concrete.

The first set of wheels 240 may be of other sizes and configurations which will not irreparably mar the surface of the concrete 230 when the saw 220 is used to cut wet concrete, as described in U.S. Pat. No. 4,869,201. Smaller wheels may be used, but then the concrete must be harder before the saw 220 can be used.

A second set of wheels 241 is connected to the frame 224 near the front or leading edge of the saw 220, and located on the opposite side of the center of gravity of the saw 220 as the first set of wheels 240. The second set of wheels 241 is preferably made of rubber, 5 inches (12.7 cm) in diameter, and about 2 inches (5.1 cm) wide. The second set of wheels 241, like the first set of wheels 240 is located on one side of the groove 238 being cut.

Referring to FIG. 13, the second set of wheels 241 is mounted on a transversely oriented axle 248. The axle 248 passes through one end of a rotatable member 250. The rotatable member 250 is rotatably connected at its other end to the frame 224 with pins 251. An actuator 252 is connected to the frame 224 at one end, and extends to connect to the rotatable member 251 at its other end. The actuator 252 has a spring 253 mounted on it which pushes against the rotatable member 250. An electrical wire (not shown) connects the actuator 252 with the actuator toggle 401 on the control panel 234. Activation of actuator 252 allows the wheels 241 to be rotated into contact with the concrete surface 230.

A skid plate 242 is attached to side 229 of the frame 224 a sufficient distance away from the position of the first and second set of wheels 240, 241 so that the groove 238 is not overridden or damaged by the wheels 240. The skid plate 242 is designed, constructed and operates like the prior skid plate 42, and a detailed description will not be repeated for common parts and operation. The skid plate 242 is designed to smoothly contact the surface of the concrete 230 and is therefore of sufficient width and length so as not to drag into the concrete surface 230.

Figure 16:
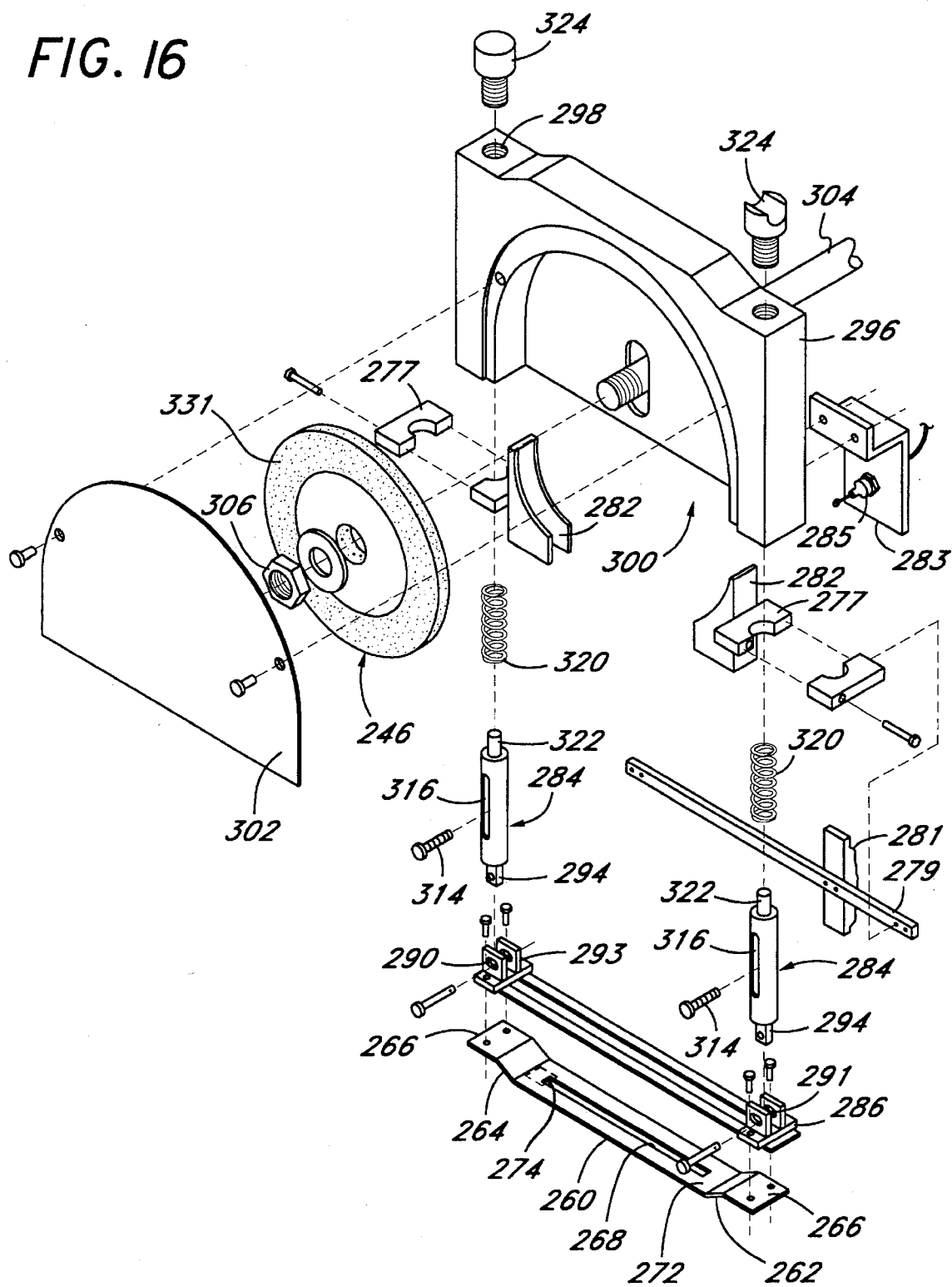
FIG. 16 is an exploded view of the concrete cutting blade, skid plate, and blade housing of the alternate concrete saw.

Referring to FIG. 16, the skid plate 242 has a middle portion 260 which contacts the surface of the concrete 230 when the groove 238 is being cut. The skid plate 242 also has a leading edge 262 and a trailing edge 264, as well as ends 266 which are flat and which extends away from the middle portion 260. The ends 266 of the skid plate 242 are offset vertically a distance away from the surface of the concrete 230, so that the middle portion 260 depends from the saw 220 a distance sufficient to contact the concrete surface 230 in order to support the concrete surface during cutting and inhibit ravelling of the concrete surface 230 adjacent the groove 238.

Referring to FIG. 16, the skid plate 242 has a slot 268 which allows the cutting blade 246 to pass through the skid plate 242 into the surface of the concrete 230. This slot 268 is located along a longitudinal axis of the skid plate 242, which axis is generally parallel to the longitudinal axis of the saw 220. The slot 268 has a leading end 272 which is closed and terminates near the leading edge 262 of the skid plate 242. The slot 268 also has a trailing end 274 which is also closed and terminates near the trailing edge 264 of the skid plate 242. At a point near the trailing end 274 of the slot 268, a recess (not shown), analogous to recess 78 of skid plate 42 (FIG. 3), extends into the bottom surface of the skid plate 242.

Ideally, the saw 220 is supported on the concrete surface 231 by the first set of wheels 240 and the second set of wheels 241. When the saw 220 is being used to cut the groove 238 in the concrete surface 230, the second set of wheels 241 are in a retracted position. This position corresponds to the actuator 252 being fully retracted.

Advantageously, the second set of wheels 241 are only partially retracted by the actuator 252 so that they still support and stabilize the saw 220 during cutting. The wheels 241 are retracted sufficiently so that only the spring 253 urges the wheels 241 into contact with the concrete 230. The spring 253 limits the force which the wheels 241 can exert on the concrete surface 230, while still making the saw 220 more stable. In one embodiment partially tested, a spring 253 resiliently exerting the second set of wheels 241 against the concrete surface 230 with a force of about 10 pounds was believed suitable for cutting wet concrete with a 4 pound force on the blade 246 and about 19 pounds downward force on the skid plate 242. Varying forces from spring 253 may be used depending on the hardness of the concrete 230, the specific location of the center of gravity of the saw 220, and the specific forces exerted by the cutting blade 246 and skid plate 242 on the concrete 230.

The second set of wheels 241 is fully engaged with the concrete 230 primarily during non-cutting or non-operation periods, as for example, when it is desired to roll the cutting saw 220 to and from various slabs of concrete, for unloading or loading the concrete saw, when the concrete saw is being maneuvered on a slab of concrete to align the saw for cutting the groove 238, or when it is desired to change the cutting blade 246 or the skid plate 242. In such a case, the second set of wheels 241 are extended downward by the actuator 252. The operator engages a switch on the control panel 234 to engage the actuator 252 which pushes the rotatable member 250, and thus the axle 248 and second set of wheels 241, downward and away from the frame 224 but toward the concrete surface 230.

Figure 23:
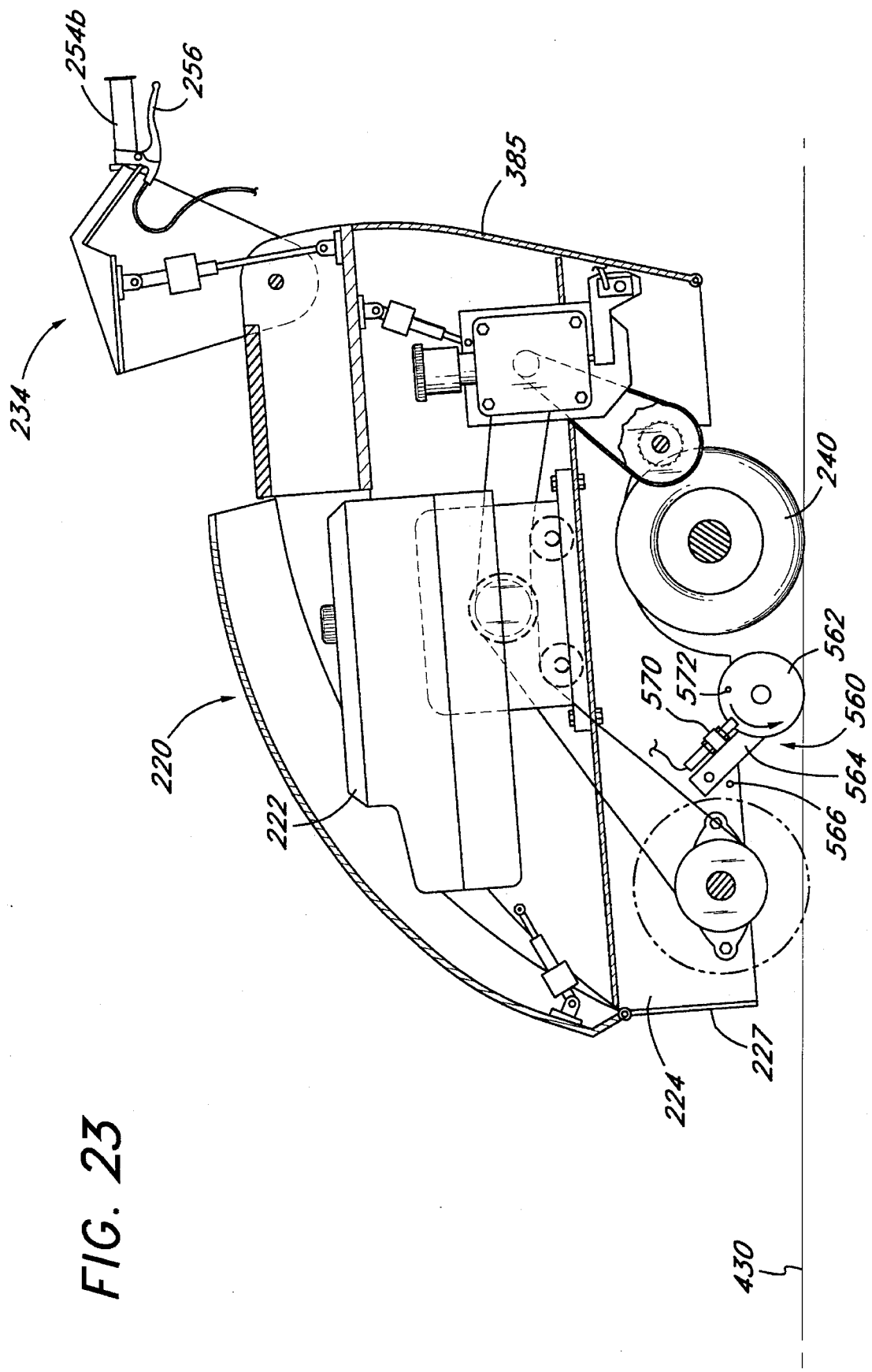
FIG. 23 is a partial side view of the alternate embodiment of the concrete saw of FIG. 13, including a distance counter mechanism.
Figure 24:
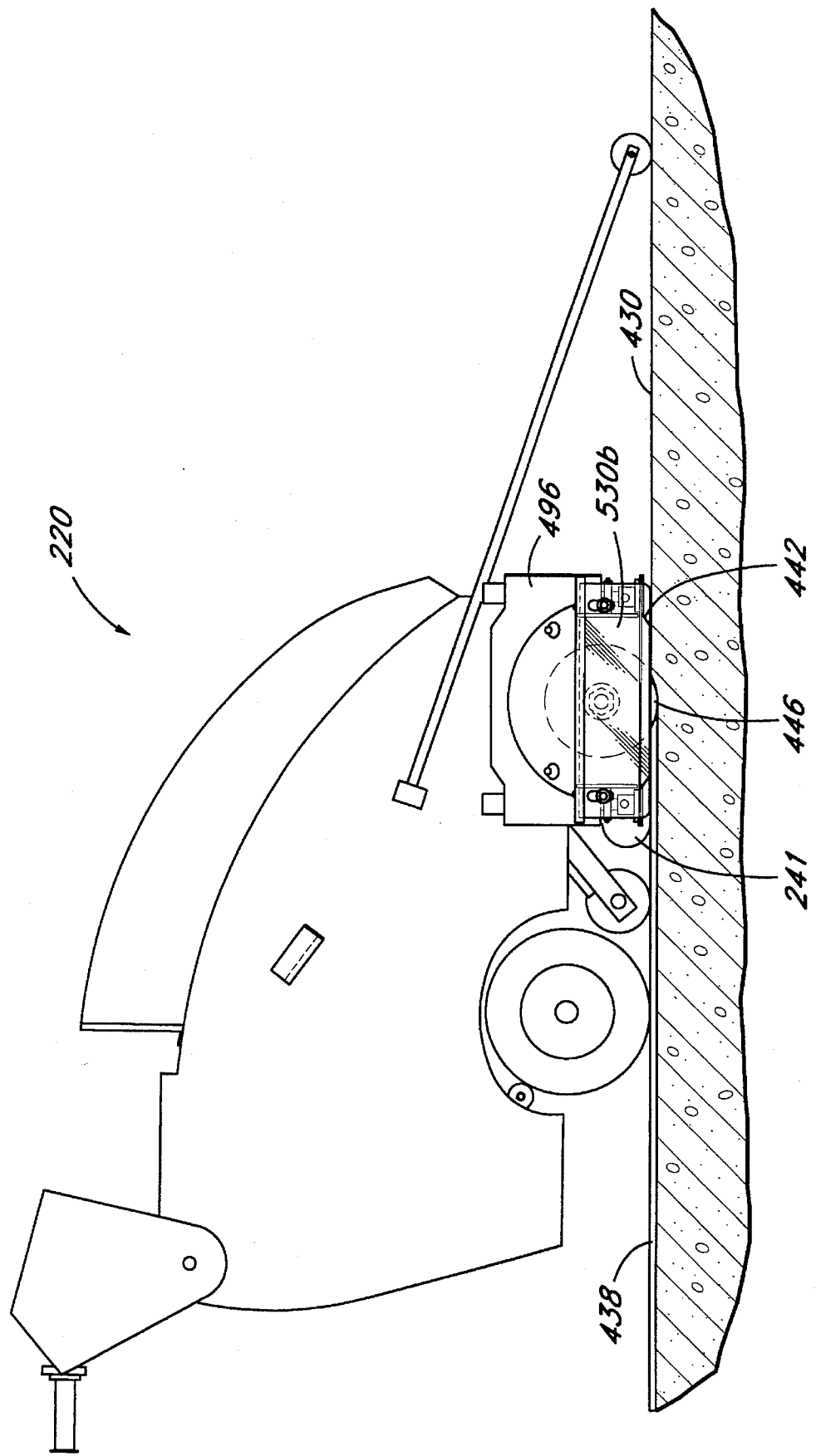
FIG. 24 is a perspective view of the concrete saw of FIG. 12 used in conjunction with yet another alternate embodiment cutting blade enclosure.

Referring to FIG. 23, a distance counter 560 is mounted to the frame 224 of the saw 220 in between the first set of wheels 240 and the second set of wheels 241 (see FIG. 24). Preferably, the counter 560 comprises a small wheel 562, about 3.75 inches in diameter, mounted on a bar or column 564. One end of the bar 564 is pivotally mounted to the saw 220 in a pin and hole arrangement. A stop 566, such as a bar or pin, is located on the frame 224 to limit the travel of the counter 560. Preferably, the stop 566 is located below the point of attachment of the bar 564 to the frame 224, to limit the movement of the bar 564 and wheel 562 toward the concrete 230. Thus, when the cutting blade 446 is disengaged from the concrete by lifting up the front end of the saw 220, the bar 564 and wheel 562 are also lifted up and disengaged from the concrete. The pin 566 prevents the bar 564 from pivoting the wheel 562 sufficiently to maintain contact with the concrete 430. Thus, when the second set of wheels 241 are engaged with the concrete surface 230, and the cutting blade 246 is lifted out of the concrete, the wheel 562 of the counter 560 no longer touches the surface of the concrete 230. Conversely, when the saw 220 is lowered such that the cutting blade 246 is cutting the concrete surface 230, the wheel 562 of the counter 560 contacts the concrete surface as well.

The counter 560 further comprises a pin 572 located near the outer circumference of the wheel 562 and protruding from the wheel 562 parallel to its axis of rotation. A sensor 570 is mounted on the bar 564. The sensor 570 is sensitive to the passage of the pin in front of it during each revolution of the wheel 562. This sensor 570 is preferably an Omron Corporation TLE-X2C1 proximity switch. The sensor 570 is connected with wiring to a counter display (not shown), which may be located on the control panel 234. Preferably, the counter is an Omron Corporation model H7EC, which is electrically self-powered. As the wheel 562 and pin 572 rotate, the counter 560 counts the number of revolutions, and keeps track of the linear distance traveled in feet when the saw 220 is cutting concrete. It is noted that when using a sensor 270 of the type described above, if three pins 572 are placed on the wheel 562, the counter 560 will keep track of the linear distance traveled in meters. As mounted, the counter 560 thus displays to the saw user the distance traveled (whether in feet or meters) when the saw 220 is in the cutting position, so that the approximate blade wear and use of the saw 220 can be monitored.

Referring to FIG. 16, the skid plate 242 is mounted at each of its ends 266 to a shaft 284 which is connected to a mounting member 286 on the skid plate 242. The mounting member 286 is rotatably connected to the ends 266 of the skid plate 242. These member 286 are illustrated as being U shaped, and are mounted to the skid plate 242.

The mounting members 286 have flat sides 293 with holes 290 passing through them to accommodate pins 292 for securing the flat sides 294 of the shafts 284 to the mounting members 286 to allow for rotation between the shafts 284 and the skid plate 242. The pins 292 are removable to allow the skid plate 242 to be easily removed or attached. Advantageously, one of the two members 286 has the hole 290 shaped in the form of a longitudinal slot 291 in which the pin 292 may slide generally parallel to the skid plate 242 to permit the skid plate 242 to move laterally to compensate for the distance change when the ends of the skid plate 242 move vertically relative to one another.

Load bearing members 328 are located one on each side of the cutting blade 246 and connect opposite ends 266 of skid plate 242. The load bearing members 328 are in tension, so that they pull the ends 266 towards one another and slightly bow the middle portion 260 away from the saw 220 and toward the concrete surface 230.

A support 277 is mounted to each of the shafts 284 just above their connection with the mounting members 286. The supports 277 are primarily rectangular plates which have a bore therein for accepting the shafts 284, and as illustrated comprise two pieces which are connected by a bolt. It is possible, however to attach the supports 277 to the shafts 284 by other methods, such as welding.

A cam block 279 connects the ends of the supports 277. The cam block 279 resembles a cross on its side. The long thin part of the cam block 279 connects the supports 277, while a cross piece with a cam 281 located thereon is located in between and is mounted parallel to the long portion of the cam block. The cam 281 is elongated and has various bumps or positions located along it. The exact shape of the cam 281 is determined by the speed sensing devise which is used to control the speed of the saw 220, as will be fully described below.

Figure 22:
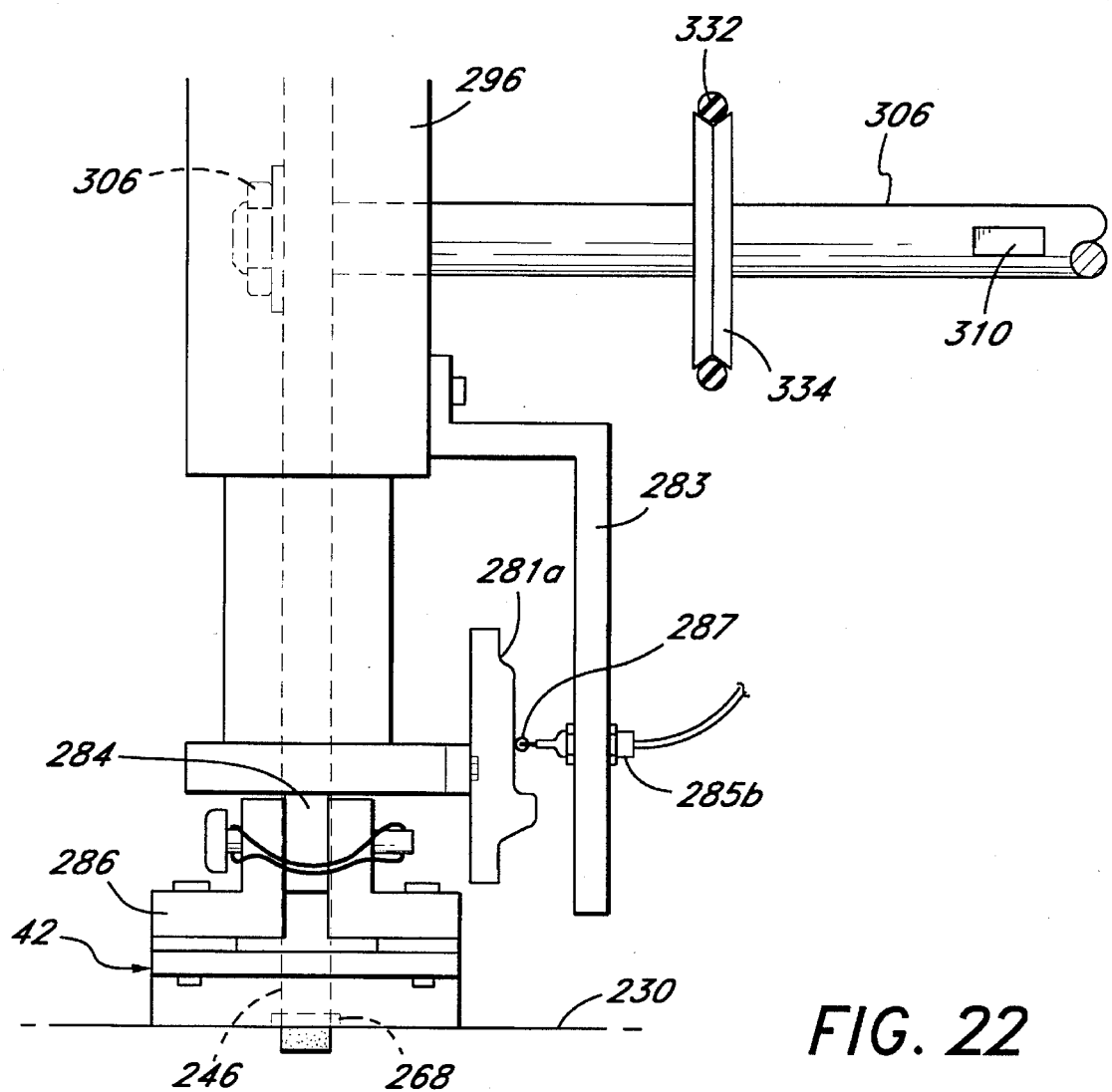
FIG. 22 is a front view of the skid plate, blade housing, and microswitch.

As illustrated in FIG. 16 & 22, a mounting bracket 283 extends from the side of the blade housing 296 facing the saw 220. The bracket 283 is L shaped, and is attached to the blade housing 296 so that it extends slightly outward towards the concrete saw 220 and then downward towards the concrete surface 230. The bracket 283 is mounted to the blade housing 296 about half way between the front of the blade housing 296 and the center of the housing by welding, screws, or the like. A microswitch 285 is attached to the bracket 283 near the bottom middle of the bracket so that upon relative movement between the skid plate 242 (to which the cam is 281 are mounted) and the blade 246 and housing 296 (to which the microswitch 285 is connected), the microswitch 285 engages the cam 281 in various positions.

The microswitch 285 is of the type which has an extending roller or pin which acts to engage or disengage the switch 285 depending on the extension position of the roller. The switch 285 has three positions: when the roller is fully compressed against the switch the switch transmits a positive voltage; when the roller is half way extended from the switch, the switch transmits a negative voltage; and when the roller is fully extended from the switch the switch transmits no voltage. The switch 285 as shown, has a threaded area which allows it to be placed in the bracket 238 through correspondingly threaded holes. The switch 285 may, of course, be mounted in any variety of other manners. The switch 285 extends towards the cam block 279 and the roller of the switch 285 contacts the cross portion of the cam block so as to engage the cam 281 in various positions upon relative movement between the blade 246 and the skid plate 242.

Referring to FIG. 16, the shafts 284 have second ends which extend into a rectangular blade housing 296 which is fastened to the saw 220 so as to enclose a portion of blade 246. The blade housing 296 has bores 298 aligned to accept the shafts 284 which support the skid plate 242. The blade housing 296 further has a semi-circular hollow section 300 in which the rotating cutting blade 246 is accepted. A removable plate 302 is attached to the blade housing 296 to allow complete access to one side of the blade 246. The blade housing 296 and plate 302 provide a safety shield to protect the user from flying particles dislodged by the cutting blade 246.

The bores 298 extend vertically through the blade housing 296 and are located near the opposite ends of the generally rectangular housing, on opposite ends of the circular hollow section 300. These bores 298 are of a slightly larger diameter than the shaft 284, so as to slidable accommodate the shafts 284 therein.

Guards 282 depend from the supports 277 towards the skid plate 242. The guards 282 are wide enough in dimension so that removed concrete which is dislodged from the cutting blade 246 and thrown therefrom is stopped by the guards 282.

Referring to FIG. 16, a slot 316 is located along a portion of the length of each shaft 284. A rod 314 has one end fastened to the blade housing 296, with the other end passing through a bore 312 in the blade housing 296 and into the slot 316 in the shaft. The rod 314 and slot 316 arrangement movably connects the shafts 284 in the bores 298 so that the shafts 284, and the attached skid plate 242 may not come free from the blade housing 296. The rod 314 and slot 316 arrangement movably connects the shafts 284 in the bores 298 so that the shafts 284, and the attached skid plate 242 may not come free from the blade housing 296.

A spring 320 is positioned inside of each bore 312 which houses the shafts 284. The springs 320 rest on a smaller cylindrical top end 322 of each shaft 284. An adjustment screw 324 is positioned above the spring 320 in each bore 298 at a point near the top of the blade housing 296, thus sandwiching the spring against at the top end 322 of the shaft 284. The springs 320 are preferably coil springs with a spring rate of about 4–5 pounds/inch when cutting wet concrete. Greater spring rates may be used for harder concrete, as the indentation of the skid plate 242 into the concrete surface 230 is not of as much concern with harder concrete. The springs 320 are compressed into the bore 312 with the adjustment screw 324. The adjustment screw 324 may be advanced into the bore 298 to compress the spring 320 against the shaft 284 and resiliently urge the shaft downwards towards the surface of the concrete 230.

The compression of each of the springs 320 between the top end 322 of the shaft 284 and the adjustment screw 324 resiliently urges the shafts 284 towards the surface of the concrete 230. The shafts 284 thus correspondingly force the skid plate 242 towards the surface of the concrete. This is necessary to aid in pressing the skid plate 242 against the concrete surface 230 with a predetermined force.

Except for the cam 281 and microswitch 285, the overall construction, mounting and operation of the floating skid plate 242 is analogous to skid plate 42, and will not be repeated.

As illustrated in FIG. 12, the blade housing 296 is mounted to the lower extending side 229 of the frame 224 at its front right hand corner. A blade drive shaft 304 passes through the side of the blade housing 296 nearest the frame 224. The shaft 304 is thus mounted perpendicular to cutting saw 220 and thus the groove 238 being cut. The shaft 304 terminates at a sufficient distance from the side of the removable plate 302 so that the cutting blade 246 and a locking nut 306 may be positioned thereon. The cutting blade 46 is thus mounted perpendicular to the drive shaft 304, to cut the groove 238.

As illustrated in FIGS. 19 & 20, slot 310 is located in the drive shaft 304 parallel to the length of the shaft for engagement by a pin 312. The pin 312 is mounted through the face plate 227 of the frame 224 and is spring biased to a disengaged position. When engaged, the pin 312 enters the slot 310 so as to prevent the rotation of the shaft 304. This allows the user to lock the drive shaft 304 and remove the locking nut 306 with a wrench so the cutting blade 246 can be replaced.

Referring to FIG. 16, the cutting blade 246 is analogous to cutting blade 46, and a detailed description will not be repeated.

The battery 405 may be set on a ledge 406 attached to the inside of one of the sides 228 of the saw 220. The battery 405 is connected to the switches and gauges on the control panel 234, and to a generator (not shown) in a manner known in the art, given the information herein. The current output of the battery 405 may be measured by connecting wiring to the ampere meter 394 on the control panel 234, as would be apparent to one skilled in the art.

A crank shaft 338 extends from the motor 222 in the direction of the side of the saw 220 on which the cutting blade 246 is mounted. A dual pulley 336 is mounted on the crank shaft 338. A belt 332 is mounted from between the dual pulley 336 and a pulley 334 located on the blade drive shaft 304. Another belt 342 is mounted between the dual pulley 336 and a pulley 340 on a saw drive mechanism 344 which is described below. Optional belt tensioning pulleys 345 may be installed to maintain the belt.

Figure 17:
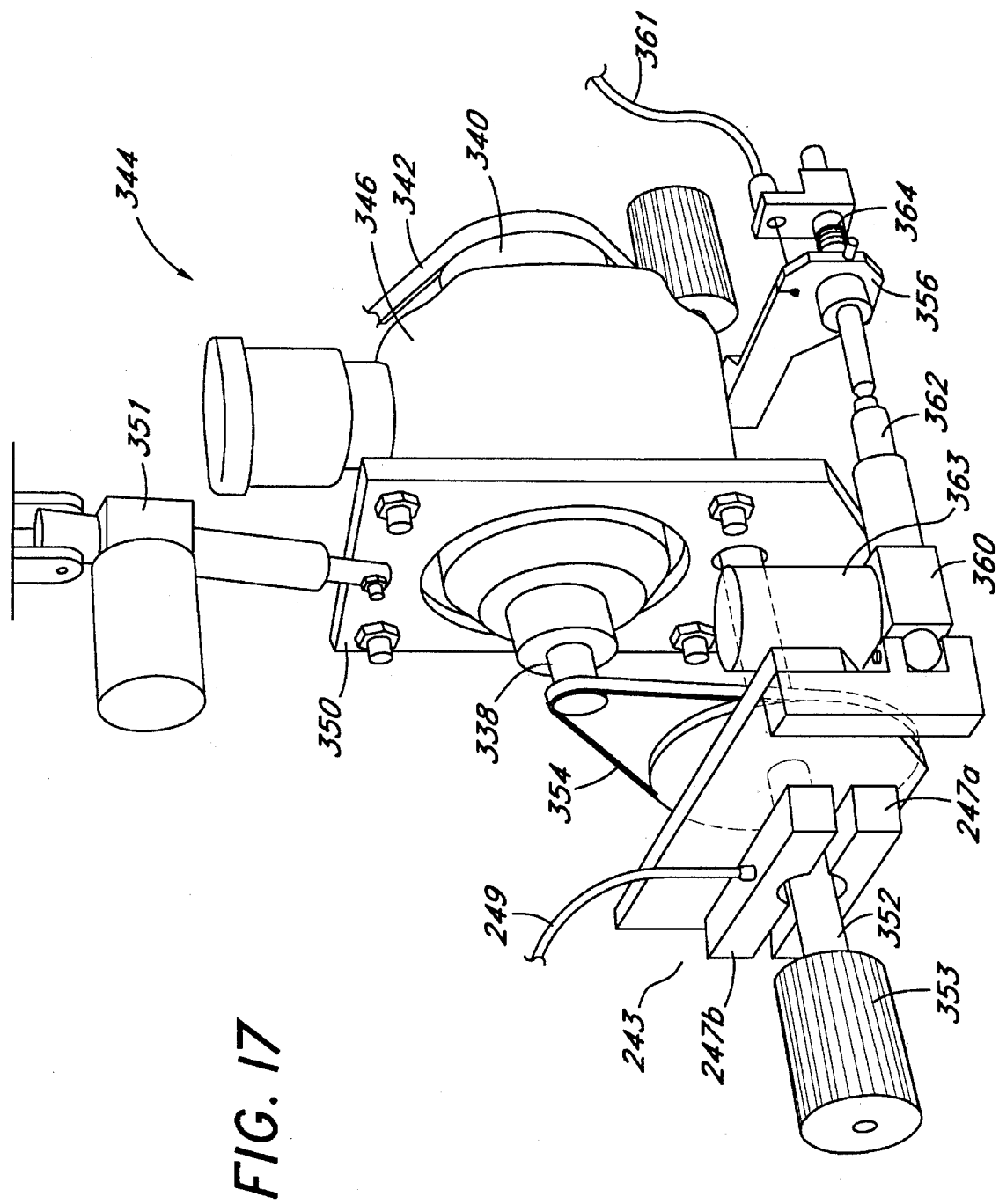
FIG. 17 is a schematic illustrating the transmission drive of the alternate embodiment of the concrete saw.

As illustrated in FIG. 17, the saw drive mechanism 344 comprises a variable speed hydraulic transmission 346 which powers a drive axle 352 mounted on a drive support plate 350. The drive support plate 350 is a rectangular metal plate which is pivotably connected at one end to the frame 224 so as to be rotatable about the frame 224. The other end of the plate 350 extends from the frame 224 towards the rear of the saw 220 for mounting the drive mechanism 344 thereto. An actuator 351 is connected to the rear of the plate 350 and a bracket which extends between the sides 228, 229. The actuator 351 is electrically connected to switch 398 on control panel 234. The actuator 351 allows the user to disengage completely the saw drive mechanism 344, for instance, if the user wants to push the saw by hand.

A chain 354 is mounted to a transmission drive gear and connects the transmission to the drive axle 352. The drive axle 352 is mounted to the drive support plate 350 so the axle 352 can rotate. A sleeve 353 is mounted on each of the ends of the axle 352. Each sleeve 353 is made of durable plastic and fits tightly enough to the axle 352 so that normally the sleeve 353 rotates with the axle 352. The axle 352 is positioned in the support plate 350 such that when the plate 350 is its normal, engaged position, the sleeves 353 are in driving contact with the rolling surfaces of the first set of wheels 240, causing the saw 220 to move. The actuator 351 can disengage the sleeves 353 from the wheels 240 to stop the self-propulsion of the saw 220.

The transmission 346 is mounted to the drive support plate 350. The transmission 346 is a hydraulically powered transmission having forward, reverse, and neutral positions. The transmission 346 has a shift lever 356 for changing speed. The free end of the shift lever 356 is connected to an arm 362 of linear actuator 360. The actuator 360 preferably has a 24-volt electric motor to drive the arm 362. The actuator 360 is powered by 12 volts to reduce its speed of operation. The actuator 360 is activated when the second set of wheels and drive toggle 401 which is electrically connected to the actuator and a drive indicator light 403 is moved. Optionally, the actuator 360 may separately be controlled through the use of the transmission actuator toggle 404, which can be electrically connected to the motor 363 of the actuator 360, as would be apparent to one skilled in the art. Normally, the actuator 360 is fully extended into a position corresponding to that where the shift lever 356 is in the neutral position. Only when the toggle 401 is activated does the motor 363 which powers the actuator 360 cause the actuator, and thus the shift lever to move towards the forward speed.

A spring 364 is compressed between the end of the actuator arm 362 and the side 229 of the saw 220. The spring 364 keeps the shift lever 356 from moving into the reverse gear. For the transmission to be shifted into reverse, the spring 364 must be overcome using the handle 254a as described below. The spring 364 and actuator 360 are chosen such that when the toggle 404 is flipped to the forward position, the actuator 360 moves the shift lever 356 of the saw 220 to a position corresponding to a cutting speed of 15 ft/min (4.6 m/min).

A cable 361 is attached to the twisting handle 254a and the shift lever 356. The cable and attachment are rigid enough to allow the cable to push or pull the shifter 356 and the arm 362 in either direction, and will extend far enough to pull the shifter 356 into reverse. Thus, the speed of the saw 220 can be manually controlled by handle 254a.

Given the above information, it is also contemplated that one skilled in the art could connect a fixed speed transmission to the motor and vary the speed at which the saw 220 is propelled across the surface of the concrete 230 by directly manipulating the speed of the motor and indirectly manipulating the speed of the transmission through the throttle control of the motor.

A partial brake 243 for steering assistance is connected to the axle 352 on the side of the axle opposite the blade 246 and the groove 238 being cut. This brake 243 comprises compression blocks 247a, b and an actuator cable 249. The compression blocks 247a, b are metal pieces with semi-circular cut outs, which, when the blocks are closed against each other, form a circular bore. The blocks 247a, b are mounted about the sleeve 245 and may be pulled together by the actuator cable 249 to close upon the sleeve 253 as described hereafter. The cable 249 passes through one block 247a and is attached to the other 247b. The other end of the actuator cable 249 is connected to the grip 256 attached to the handle 254b on the control panel 234 as described above. When the grip 256 is not squeezed, the actuator cable 249 is long enough so that the blocks 247a, b do not touch one another. When the grip 256 is squeezed, the cable 249 pulls the blocks 247a, b together against the sleeve 253.

When it is desired to cut a groove 238 in concrete 230, the saw 220 is moved into position by rolling it on the first and second set of wheels 240, 241. The cutting saw is aligned with the desired line to be cut using the alignment guide 370. The guide 370, which should be in its non-use position against the stop 374 is lowered by engaging the actuator 376 connected to the guide 370. The guide 370 is pivoted until it comes to rest just above the surface of the concrete 230, with the roller sight 372 located along the line to be cut. The motor 222 is started by turning the ignition switch 389, and skid plate 238 is lowered towards the surface of the concrete 230 as the second set of wheels 241 are retracted when the operator presses the toggle button 401. At this time the transmission 346 is in neutral and the saw 220 is not moving, although the cutting blade 246 will be turning. As the second set of wheels 241 are retracted the saw 220 pivots about the rear axle 244, causing the skid plate 242 to approach the generally horizontal concrete surface 230 in an arc which will normally bring the rear of the skid plate 242 into contact with the surface 230 before the front of the skid plate 242 contacts that surface. Alternatively, the skid plate 242 may contact the surface in a completely horizontal fashion. Should the leading edge 262 of the skid plate 242 contact the concrete surface 230 first, the concrete surface will be gouged and torn by the leading edge of the skid plate 242 as the cutting blade 246 is lowered.

In the concrete saw 220 as illustrated, the skid plate 242 is tilted so that the trailing edge 264 is closer to the surface of the concrete 230 than the leading edge 262 by having the slot 316 in the shaft 284 connected to the leading edge 262 be shorter than that in the shaft 284 connected to the trailing edge 262. Therefore, the skid plate 242 will again be tilted so that the trailing edge 264 of the skid plate contracts the surface of the concrete 230 first when the cutting blade 246 is lowered. It is contemplated that if the concrete saw 220 does not pivot, then the skid plate 242 may be either be tilted or may be horizontal with respect to the surface of the concrete 230, because when the concrete saw 220 lowers straight down, either of these skid plate arrangements will prevent gouging of the concrete surface.

It is also desirable for the skid plate 242 to be below the edge of the cutting blade 246 closest to the surface of the concrete 230 when the skid plate 242 is not engaging the surface of the concrete 230. In this manner, when the skid plate 242 is lowered so that the cutting blade 246 contact the surface of the concrete 230, the skid plate will preferably be in contact with the surface of the concrete before the cutting blade 246. In this manner, the skid plate 242 is already supporting the surface of the concrete 230 around the area to be cut when the cutting begins, and the groove 238 cut will not ravel. This may be accomplished by adjusting the length of the shafts 284 and adjusting the spring 320 compression as discussed regarding the first embodiment and skid plate 42.

The skid plate 242 is lowered into contact with the surface of the concrete 230, and then the second set of wheels 241 are further retracted until the cutting blade 246 moves through the slot 268 of the skid plate 242 into the concrete surface 230. The cutting blade 246 is lowered to its lowest point, that being where the cutting blade engages the surface of the concrete 230 to a depth of about 1.25 to 1.375 inches (3.2 to 3.5 cm), although a nominal depth of 1.1825 inches is also believed suitable.

The exact depth at which the cutting blade 246 cuts, and hence the depth of the groove 238 being cut, depends on the force with which the blade 246 is urged against the concrete surface 230 and the speed of the saw 220.

The downwards force exerted on the blade 246 is controlled by placing the center of gravity of the cutting saw 220 primarily over the axle connecting the first set of wheels 240. The center of gravity of the cutting saw 220 is slightly offset, however, to exert a predetermined force on the skid plate 242. The amount of offset may vary depending on the hardness of the concrete to be cut. For wet concrete, with a hardness such that a steel rod weighing about 5.75 pounds, having a diameter of 1.125 inches, when dropped from a height of about 24 inches from the surface of the concrete makes an indentation of about 0.5 inches (1.27 cm) with a flat end of the rod, the offset is such that the force on the approximately 4 pounds of force are exerted on the blade 246, and about 1 psi or less is exerted by the skid plate 242. Thus, the weight of the saw 220 is balance substantially over the rear axle 244, but offset by an amount sufficient to exert a predetermined force on the cutting blade 242 and skid plate 242. The force will vary with the hardness of the concrete to be cut, increasing with harder concrete.

For a nominal cutting depth of 1 3/16 inches (1.1875 inches or 3 cm) with a 10 inch diameter blade 246, the force urging the blade 246 into the concrete is believed to be about four pounds, in addition to the force needed to compress the springs 230 which urge the floating skid plate 242 against the concrete 230. This is for the wet concrete where the rod indentation is about 0.5 inches. For wet concrete with harder aggregate, a force of about 5 pounds on the cutting blade 246 is believed suitable.

As the blade 246 rises out of the concrete 230, as when it hits some large and hard aggregate, the springs 320 exert a restoring force through the saw 220 onto the blade 246 to urge the blade back into the concrete. When the blade 246 has risen to a depth of 15/16 inches (0.9375 inch or 2.38 cm), the downward force on the blade 242 is believed to be about six pounds in wet concrete where the rod indentation is about 0.5 inches. A spring constant of about 4–5 lb/in is believed appropriate for each of the springs 320 for the wet concrete.

If the diameter of blade 246 is 9 inches (22.9 cm) a downward force on the blade 246 of about four pounds is believed suitable. For an 8 inch (20.3 cm) diameter blade 246, a downward force on the blade 246 of about 3.7 pounds is believed suitable. The spring constant and downward force on the blade 246 are believed to change linearly. These forces and spring constants are the current best estimates and have not yet been experimentally verified.

The force exerted by the blade 246 and skid plate 242 may be adjusted in one method by selecting the mounting location of the motor 222 at a point suitably offset from the axle 244 of the first set of wheels 240 when the axle 244 is mounted towards the center of the frame 224. Alternatively, the forces may be adjusted by mounting the first set of wheels 240 in a position nearer the rear of the frame 224 and away from the cutting blade 246, and them moving the motor 222 rear of the axle 244 on which these wheels turn. Rather than shifting the location of components, the addition of balance weights could also be used to vary the force on the blade 246 and skid plate 242. To adjust the force exerted by the skid plate 242 when a different diameter cutting blade 2465 is used, the motor 222 may be moved relative to the axle 244, the axle 244 may be moved with respect to the frame 224, or balance weights may be added.

As illustrated, the majority of the weight of the saw 220, which is believed to be about 200–250 pounds total, is centered over the rear axle 244. The saw 220 is balanced so that it exerts about 10 pounds of force on the second set of wheels 241 during cutting, approximately 19–20 pounds of force onto the skid plate 242 during cutting, and about 4 pounds on the cutting blade 246, for a cutting depth of 1.1875 inches with a 10-inch blade 246. The saw blade 246 floats about a nominal cutting depth, sinking deeper in softer concrete and rising slightly in harder concrete or when large or hard aggregate is encountered. The force on saw blade 246 thus also varies slightly during cutting.

The skid plate 242 is about 19 square inches in size, so there is about one psi or less of pressure exerted by the skid plate 242 on the concrete 230. For cutting wet concrete with a hardness such that a steel rod weighing about 5.75 pounds, having a diameter of 1.125 inches, when dropped from a height of about 24 inches from the surface of the concrete makes an indentation of about 0.5 inches (1.27 cm) with a flat end of the rod, the weight distribution is such that the force on the skid plate 242 is not less than 0.5 psi, nor greater than 1.25 psi, with a pressure of about 0.8–1.0 psi being preferred. The low pressure on the skid plate 242 helps prevent the skid plate from sinking into wet concrete or digging or disrupting the concrete surface 230 when it is wet. If concrete harder than 1200 psi is cut, then smaller skid plates may be used, so long as sufficient support is provided to prevent raveling of the cut groove 238 while avoiding unacceptable marking of the concrete surface 230 by the skid plate.

This weight distribution and the independent movement of the skid plate 242 relative to the cutting blade 246 allows the cutting blade 246 to move upwardly, away from the concrete surface 230 if the blade 246 hits some large aggregate, while the skid plate 242 maintains contact with the concrete surface 230 to inhibit ravelling.

Advantageously, the size of the portions of the saw 220 which movably support the saw on the concrete surface 230 during cutting are sized so that the portions supporting the saw on the concrete will not leave permanent indentations of more than 1/16 of an inch (0.159 cm) in the concrete. The saw 220 is believed suitable for cutting grooves 238 without raveling when the concrete has a hardness such that a steel rod weighing about 5.75 pounds, having a diameter of 1.125 inches, when dropped from a height of about 24 inches from the surface of the concrete makes an indentation of about 0.5 inches (1.27 cm) with a flat end of the rod. The supporting portions primarily include the wheels 240, and if needed, the wheels 241. To a lesser extent, the support portions also could be considered to be the skid plate 242 as it is urged against the concrete 230 with a predetermined force, and to that extent helps support a portion of the saw 220.

The saw 220 is believed to suitable to cut grooves 238 in harder concrete without raveling, as where the rod produces indentations of 1/32 of an inch or less. Preferably, the saw 220 is used before the concrete 230 cracks. As the saw 220 is used to cut harder concrete, the downward force on the cutting blade 246 may need to be increased, while the force on the skid plate 242 may be reduced, so long as sufficient force is applied to maintain support to the concrete adjacent the groove to inhibit raveling of the concrete at the cut groove.

Once the cutting blade 246 is in the concrete surface, the operator may begin to cut the groove 238. The saw 220 may be pushed manually, however it is preferred that the drive mechanism 344 be used. The drive mechanism 344 drives the saw 220 at a more uniform rate, which in turn causes less variation in the cut groove 238.

At the same time that the operator engages second set of wheels actuator and drive toggle 401 and raises the second set of wheels 241 so that the cutting blade 246 lowers into the surface of the concrete 230, power is delivered to the microswitch 285 and thus the actuator 360. As the cutting blade 246 lowers into the concrete 230, the microswitch 285 roller, which began in the neutral position, moves up onto a raised portion of the cam 281 such that switch 285 causes a negative voltage to be sent to the motor 363. However, the motor 363 is in the fully extended position and the negative voltage does not cause its extension to change. As the blade 246 continues to approach the skid plate 242, the switch 285 moves onto another raised portion of the cam 281 which further compresses the switch 285 causing a positive voltage to be sent to the actuator motor 363, causing the actuator 360 to retract and move the shift lever 356 so the transmission 346 propels the saw 220 forward. As the blade 246 reaches its desired cutting depth, the roller on switch 285 falls off the highest cam into a neutral position. Thus as the cutting blade 246 is lowered completely, the roller moves over a high cam bump, and then settles in a final position where the roller is in a position where the switch 285 is in neutral. This position corresponds to that where the saw 220 will be moving forward preferably at the preset speed of 15 ft/min (4.6 m/min). The operator may slow down the saw 220 by twisting the handle 254 so as to pull the shifter 356 towards a slower transmission setting.

The cutting blade 246, which is connected to the motor 222 with a belt 332, preferably turns in a counterclockwise motion when cutting wet concrete so that the leading cutting edge 326 of the cutting blade moves out of the surface of the concrete 230. In other words, the cutting blade 246 moves so as to impede the motion of the concrete saw 220 in its forward direction when it is cutting wet concrete. In this manner, the cutting blade 246 removes concrete and brings it to the surface in the slots in the cutting segments 331, where it is deposited onto the sides 236 of the skid plate 242.

As described above, the cutting blade 246 is allowed to move upwardly away from aggregate which it encounters in the concrete surface 230. This is desirable because when the concrete 230 being cut is wet, as is desirable when using this saw 220, aggregate in the concrete may be disrupted by the cutting blade 246 and be pushed away, thus destroying the integrity of the concrete and possibly resulting in concrete ravelling. Allowing the blade 246 to move lessens the impact on the aggregate and reduces damage to the concrete surface 230. However, while the cutting blade 246 is allowed to move out of the concrete surface 230 away from any aggregate that it may encounter, this tends to cause the groove 238 to have a non-uniform depth. In order to maintain the advantageous cutting depth of 1.25 to 1.5 inches (3.2. to 3.8 cm), or the alternative nominal depth of 1.1875 inches, the cutting blade 246 is allowed to move, initially, upwards away from aggregate, after which it is urged downward onto the aggregate so as to cut more downwardly through it. The floating skid plate 242 allows the concrete surface 230 to be supported as the blade 246 moves. A speed control system is provided by which the saw 220 slows down.

Figure 21:
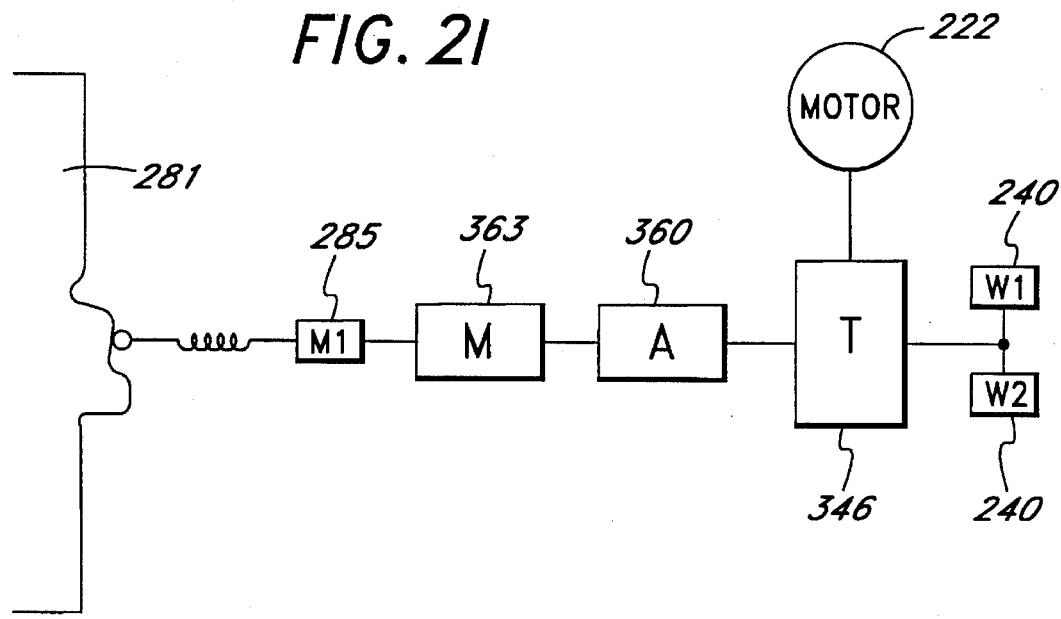
FIG. 21 is a block diagram illustrating the parts and connections of the microswitch transmission control.

The mechanism which allows the blade 246 to cut the aggregate is best shown in FIGS. 21 & 22. When the cutting blade 246 is cutting a groove 238 and encounters a piece of aggregate, the blade 246 will move upwards as if to exit the concrete 230. When this occurs, the microswitch 285 moves with the blade 246 and housing 296 upwards over the highest cam, into a raised cam position which sends a negative voltage to the motor 363 causing the actuator to extend and slow down the saw 220. The transmission 236 speed will change fairly slowly even though the voltage dropped suddenly, in part because of the response time of the hydraulic transmission 236, and in part because the motor 363 on the actuator 360 is set to run at 24 volts, while the voltage actually used is around 12 volts.

When the saw 220 slows down, the cutting blade 246 will have time to cut through the aggregate which it encountered. As the blade 246 cuts through the aggregate, the blade will lower back into the concrete surface 230, and the roller of the microswitch 285 will move back along the cam 283 onto the highest cam position which will cause the saw 220 to speed up as previously described. The roller on the microswitch 285 is expected to alternate between the positions which cause the saw 220 to speed up or slow down as the saw repeatedly encounters and cuts through aggregate. In this fashion, aggregate which is encountered is not pushed away by a sudden impact, and yet is cut in order to maintain substantially constant groove depth, all while maximizing the speed of travel of the saw 220.

Microswitches are not the only means of increasing or decreasing the voltage, and thus controlling the speed of travel of the saw 220 as the cutting blade 246 moves relative to the skid plate 242. It is contemplated that a linear potentiometer could be connected between the skid plate 242 and apart of the saw 220 which moves with the saw blade 246. The voltage from the linear potentiometer would vary continuously with the relative position of the blade 246 and skid plate 242 in order to send a continuous control signal that can be used to vary the speed of the saw 220, unlike the microswitch 285 described above which have three distinct positions. Indeed, an energized coil in the bores 298 could surround a magnetized shaft 284 to form a linear potentiometer for use as described above.

Given the disclosure herein, various other ways of implementing the speed control could be devised by one skilled in the art. There are thus provided a variety of means for generating a signal responsive to the relative motion between the cutting blade and the skid plate. More broadly phrased, there are a variety of ways described to detect relative motion between the skid plate and a portion of the saw which may be correlated to the motion of the cutting blade, and the signal generated in response to this detected relative motion can be used to vary the speed with which the cutting blade is moved through the concrete surface 230.

The cutting of the groove 238 by the concrete saw 220 preferably occurs within about two hours after pouring or at such time as the saw 220 can be moved across the concrete surface 220 without unacceptably marking the concrete surface 230. Because the concrete 230 is preferably cut while it is still wet and soft, the size of the slot 268 surrounding the cutting blade 246 must be designed to provide support to the concrete surface 230 surrounding the cutting blade sufficient to prevent ravelling of the groove 238. The width and length of the slot 268 in the skid plate 242 are important in determining the characteristics of the cut groove 238 when cutting wet concrete, as discussed in U.S. Pat. No. 4,768,201. It has been determined that too wide of a slot 268 will, relative to the width of the cutting segments, cause the concrete surface adjacent slot 238 ravel. As the concrete hardens, wider spacings between the slot 238 and the adjacent cutting blade 246 can be accommodated without raveling, but the risk of having the concrete crack before it cut also increases with the harder concrete. The relative spacing and design of the various aspects of skid plate 242 is the same as discussed above regarding skid plate 42, and will not be repeated here.

Because the cutting blade 246 is located on one side of the cutting saw 20, cutting resistance will cause the concrete saw to travel along a path angling towards the side of the saw on which the cutting blade is mounted. In order to compensate for this resistance and get the saw 220 to travel in a straight line, the operator may engage the grip 256 which presses the brake blocks 247a,b against the sleeve 253 on the drive axle 352. The brake 243 causes the sleeve 253 to stop rotating with the axle 352 but does not stop the axle 352 from turning. That is, the sleeve 253 slips on the axle 352 and does not drive the adjacent wheel 240. Thus the drive to the wheel on the side of the saw 220 opposite the cutting blade 246 is stopped. Because only the wheel on the side 229 of the saw 220 on which the cutting blade 246 is located is being driven, this causes the saw 220 to begin to turn somewhat in the direction away from the cutting blade 246, thus compensating for the blade resistance. In this manner, the operator may selectively engage the brake 243 to maintain the exact cutting line desired. There is thus advantageously provided a means for varying the rotation of one of the wheels to steer the saw 220.

Referring to FIGS. 24–27, there is illustrated an alternate embodiment of the blade housing 496 and skid plate 442 arrangement. In this description, the "top" of the part refers to the portion of that part which is farther away from the concrete 430, while the "bottom" of a part refers to the portion of the part which is closer to the concrete. In particular, blade housing 496 is designed to work in the same manner as those described above, and in communication with both saw 20, 220 embodiments described above. However, this design acts particularly well to deaden the noise created during cutting of the concrete, thus protecting the user and reducing the disruption to surrounding dwellings and people.

Figure 25:
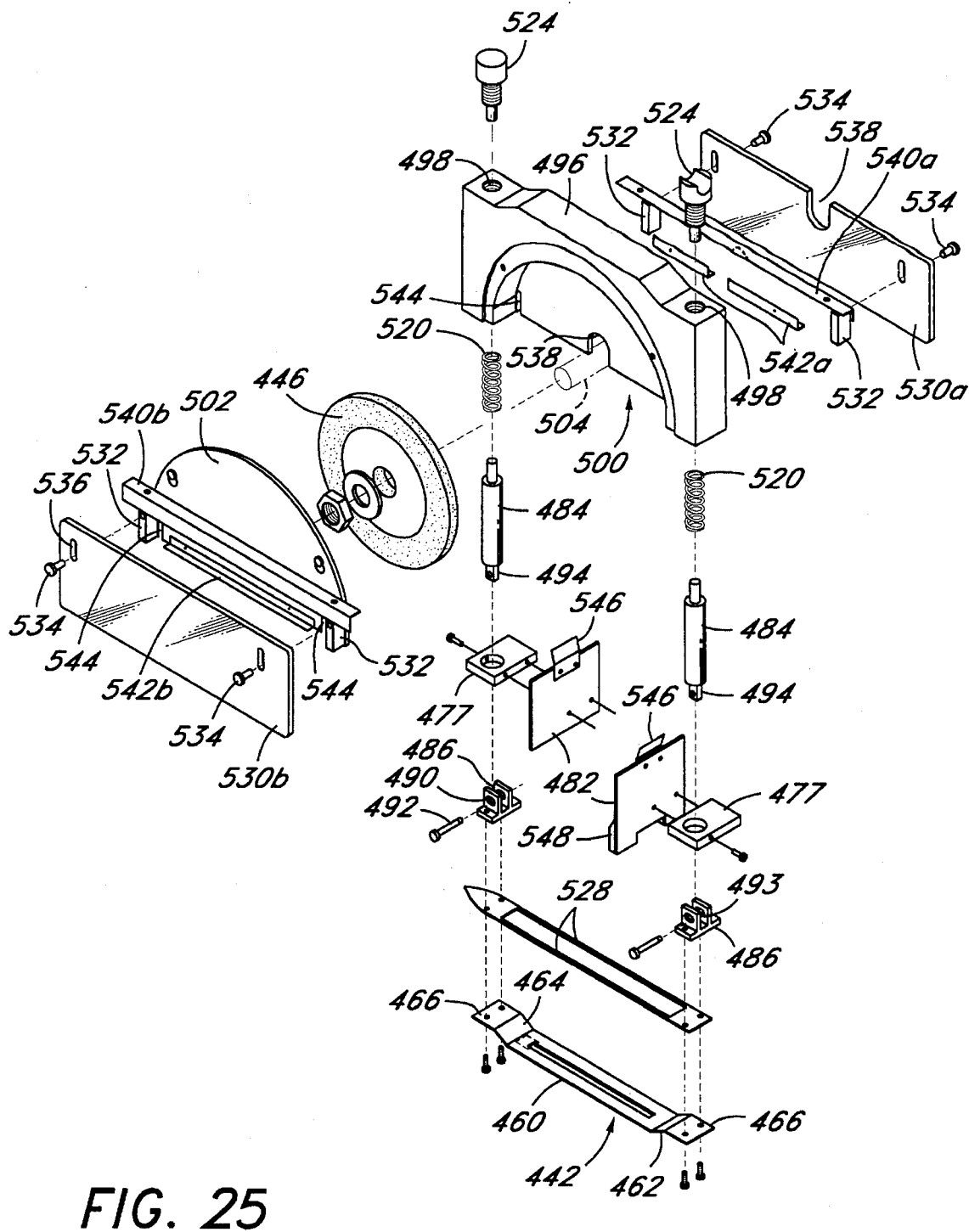
FIG. 25 is an exploded view of the concrete cutting blade, skid plate, blade housing and guards of the alternate embodiment cutting blade enclosure of FIG. 24.
Figure 26:
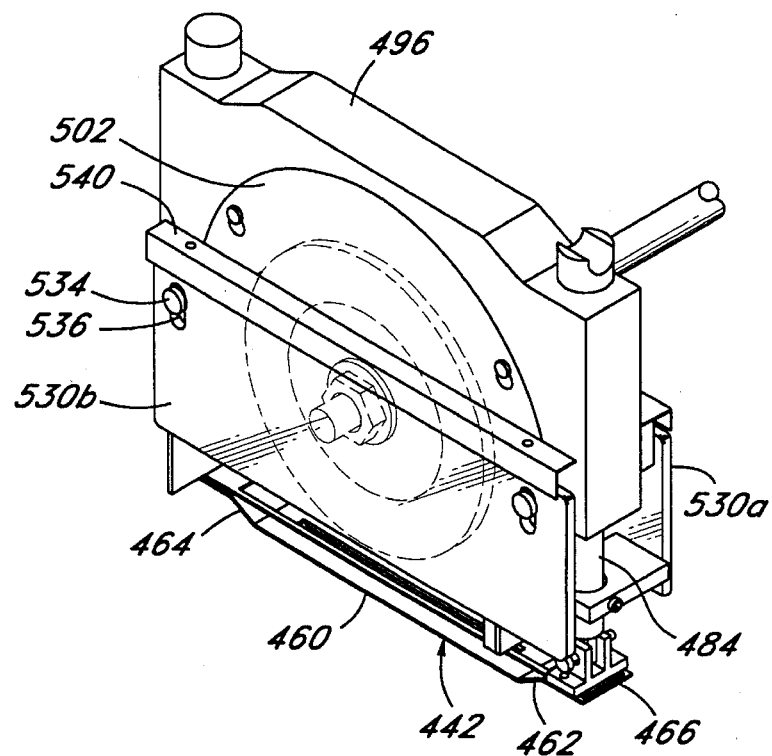
FIG. 26 is a perspective view of the alternate embodiment cutting blade enclosure of FIG. 24.
Figure 27:
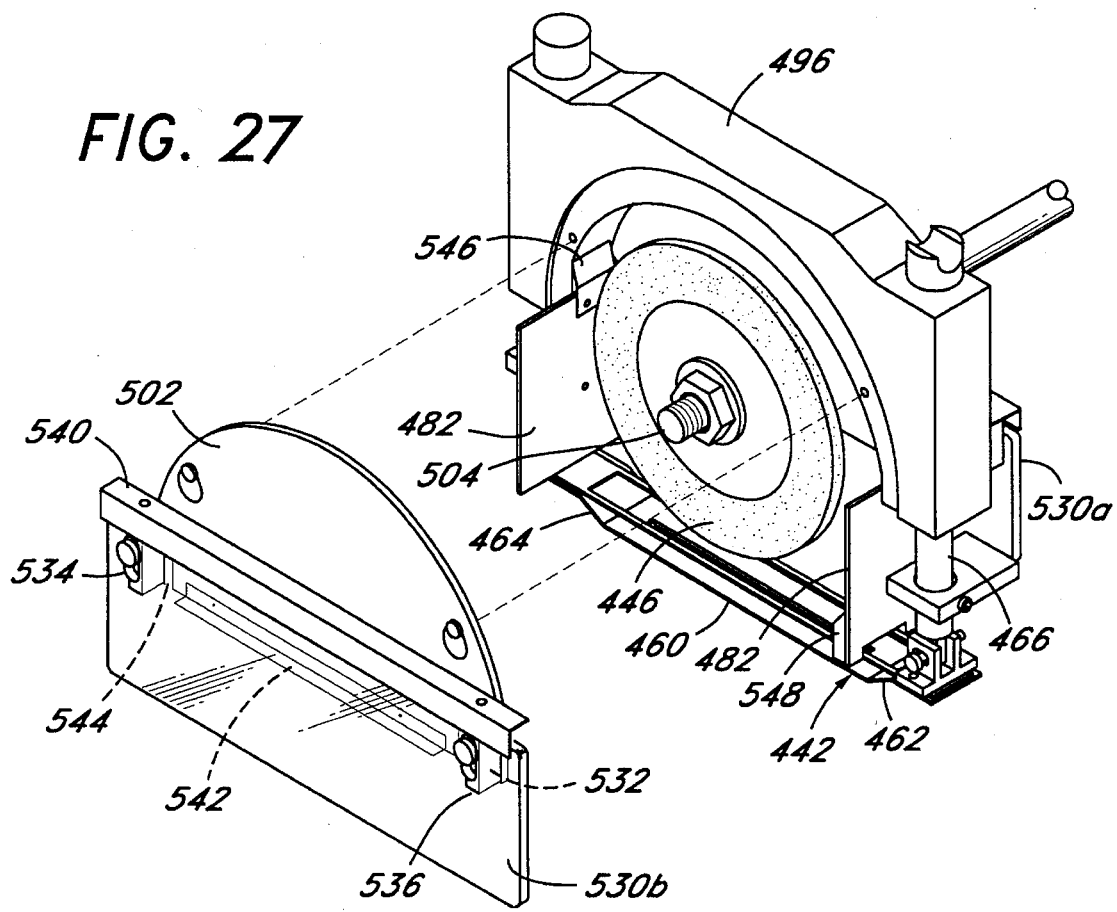
FIG. 27 is a perspective view of the alternate embodiment cutting blade enclosure of FIG. 24 with the cover plate removed.

In particular, as illustrated in FIGS. 24 & 25, a skid plate 442, which is designed, constructed and operates like the prior skid plate 42, has a middle portion 460 which contacts the surface of the concrete 430 when the groove 438 is being cut. The skid plate 442 also has a leading edge 462 and a trailing edge 464, as well as ends 466 which are flat and which extend away from the middle portion 460.

The skid plate 442 is mounted at each of its ends 466 to shafts 484 which have one end connected to a mounting member 486 on the skid plate 442. The mounting member 486 is rotatably connected to the opposing ends of the skid plate 442. These members 486 are illustrated as being U shaped, and are mounted to the skid plate 442 with the use of screws.

The mounting members 486 have flat sides 493 with holes 490 passing through them to accommodate pins 492 for securing the flat sides 494 of the shafts 484 to the mounting members 486 to allow for rotation between the shafts 484 and the skid plate 442. The pins 492 are removable to allow the skid plate 442 to be easily removed or attached. Advantageously, one of the two members 486 has the hole 490 shaped in the form of a longitudinal slot in which the pin 492 may slide generally parallel to the skid plate 442 to permit the skid plate 442 to move laterally to compensate for the distance change when the ends of the skid plate 442 move vertically relative to one another.

Load bearing members 528 are located one on each side of the skid plate 442 and connect opposite ends 466 of skid plate 442. The load bearing members 528 are in tension, so that they pull the ends 466 towards one another and slightly bow the middle portion 460 away from the saw 460 and towards the concrete surface 430.

The shafts 484 have second ends which extend into a rectangular blade housing 496 which is fastened to the saw 420 so as to enclose a portion of a concrete cutting blade 446, similar to that described in conjunction with the previous embodiments. The blade housing 496 has bores 498 aligned to accept the shafts 484 which support the skid plate 442. The blade housing 496 further has a semi-circular hollow section 500 in which the rotating cutting blade 446 is accepted. A removable plate 502, about 0.125 inches thick, is attached to the blade housing 496 to allow complete access to one side of the blade 446. The blade housing 496 and plate 502 provide a safety shield to protect the user from flying particles dislodged by the cutting blade 446. Preferably, in this embodiment, the housing 496 is constructed from a single block of aluminum. The housing 496 and plate 502 enclose the upper portion of the cutting blade 446. The mass of the housing 496 with its thick walls are believed to help to deaden the sound created by the cutting blade 446 during operation of the saws.

The bores 498 extend vertically through the blade housing 496 and are located near the opposite ends of the generally rectangular housing, on opposite ends of the circular hollow section 500. These bores 498 are of a slightly larger diameter than the shaft 484, so as to slidable accommodate the shafts 484 therein.

A spring 520 is positioned inside of each bore 512 which houses the shafts 484. The springs 520 rest on a smaller cylindrical top end 522 of each shaft 484. An adjustment screw 524 is positioned above the spring 520 in each bore 498 at a point near the top of the blade housing 496, thus sandwiching the spring against at the top end 522 of the shaft 484. The springs 520 are preferably coil springs with a spring rate of about 4–5 pounds/inch when cutting wet concrete. Greater spring rates may be used for harder concrete, as the indentation of the skid plate 442 into the concrete surface 430 is not of as much concern with harder concrete. The springs 520 are compressed into the bore 512 with the adjustment screw 524. The adjustment screw 524 may be advanced into the bore 498 to compress the spring 520 against the shaft 484 and resiliently urge the shaft downwards towards the surface of the concrete 430.

The compression of each of the springs 520 between the top end 522 of the shaft 484 and the adjustment screw 524 resiliently urges the shafts 484 towards the surface of the concrete 430. The shafts 484 thus correspondingly force the skid plate 442 towards the surface of the concrete. This is necessary to aid in pressing the skid plate 442 against the concrete surface 430 with a predetermined force.

A support 477 is mounted to each of the shafts 484 just above their connection with the mounting members 486. The supports 477 are primarily rectangular plates which have a bore therein for accepting the shaft 484, and as illustrated, comprise a single piece attached with a screw. It is possible, however, to attach the supports 477 to the shafts 484 by other methods, such as welding.

In connection with this blade housing 496 and skid plate 442 assembly, side shields or guards 530a,b and front and rear guards 482 are used to further enclose the cutting blade 446. These shields or guards 530a,b and 482, used in conjunction with the blade housing 496 and plate 502 enclose the non-engaged portions of the cutting blade 446 to reduce the noise created during cutting of the concrete, as well as trap dislodged concrete and keep it from being strewn about the surface of the concrete 430. The non-engaged portion of the cutting blade 446 is that portion of the blade 446 that is not engaged with the concrete 430. The engaged portion refers to that portion of the blade 446 which extends into the concrete 430 so to be surrounded by the concrete during cutting.

The side guards 530a,b depend from each side of the blade housing 496. The side guards 530a,b are primarily rectangular in shape and may be made of any other material which is durable and effective in blocking concrete dislodged by the cutting blade 446. Further, it is desired that the material be clear, in order that the user may see through the guard 530a,b so as to see the cutting blade 446 and skid plate 442. A material which does not readily transmit sound is also preferable. It has been determined that a 0.25 inch thick sheet of Lexan is a good material from which to fabricate the side guards 530a,b.

One side guard 530a is mounted on the side of the housing 496 closest the saw 420, and the other guard 530b is mounted to the removable plate 502, so that the guards 530a,b are parallel to, but on opposite sides of the cutting blade 446. Further, in order to allow the passage of the blade drive shaft 504 into the housing 496, the guard 530a located closest to the saw 420 has an elongated notch 538 located in it to coincide with the location of the shaft 504 so as to enclose the rotating shaft 504.

The guards 530a,b are connected to the housing 496 through mounting blocks 532. The mounting blocks 532 are located near the leading and trailing ends of the exterior of the housing 496, on each side of the blade 446, for a total of four blocks 532. A mounting screw 534 connects the guards 530a,b to each mounting block 532. The guards 530a,b depend from the screws 534 in each block 532.

In order that the guards 530a,b be movable vertically, a vertical slot 536 is formed into each guard 530a,b to accept each screw 534. A washer (not shown) may be used in connection with each screw 534.

In order to seal the space between the top of the guards 530a,b and the housing 496, and to hold the mounting blocks 532, top and bottom shields 540, 542 are employed on each end of the housing 496. The top shields 540a,b are elongated members with an L-shaped cross-section; they are mounted in an inverted fashion over two edges of the rectangular mounting blocks 532, on opposite sides of the housing 496. The top shields 540a,b are parallel to the side of the cutting blade 446, but on opposite sides of the blade 446. The top shields 540a,b each preferably extend away from the housing 496 just past the outer surface of each guard 530a,b. Each top shield 540a,b extends downwardly at least past the top of each guard 530a,b, the top shield 540a located on the side of the housing 496 closest the saw 420 having a small notch to allow the passage of the blade drive shaft 504.

The bottom shields 542a,b are also preferably elongate members with an L-shaped cross section, parallel to the sides of the cutting blade 446. The bottom shields 542a,b are preferably mounted directly to the housing 496 and plate 502, respectively, and located at the very bottom of the housing 496 and plate 502. Preferably, the bottom shields 542a,b each extend out from the housing 496 to a point near the inside surface of each guard 530a,b. The bottom shield 542 on the side closest to the saw is preferably constructed of two pieces located on either side of the notch 538 in the blade housing 496 which allows the passage of the drive shaft 504.

Front and rear guards 482 depend from the supports 477 towards the skid plate 242. The front and rear guards 482 thus help seal off the front and rear ends of the non-engaging portion of the cutting blade 446. The guards 482 are of a width such that they extend between the inner surfaces of the side guards 530a,b. The end guards 482 preferably extend from the load bearing members 528 upwardly into the housing 496.

Four slots 544 are located in the housing 496 and plate 502 in order to allow the guards 482 to move up and down with the skid plate 442 in relation to the housing 496. Two of the slots 544 are in the hollow section 500 of housing 496, and two of the slots 544 are located in the cover plate 502. The top of the end guards 548 fit into these slots 544. The end guards 548 move with the skid plate 442, and the slots 544 allow relative motion between the end guards 548 and the housing 496, while helping to substantially enclose the non-engaged portion of the cutting blade 496.

In order to prevent dislodged concrete from slipping in between the top of the end guard 482 and the housing 496, a smaller piece of spring metal 546 is attached to the top center of each guard 482. These smaller pieces 546 are preferably attached to the guards 483 with screws, and are bent in a direction so as to be urged against the inside of the housing 496. The pieces 546 are as wide as the space between the cover 502 and the hollow section 500, so as to seal off that space.

Small blocks 548 are located on both sides of the skid plate 442 on the front guard 482 which is near the leading edge 462 of the skid plate 442. Preferably, these small blocks 548 extend between the skid plate 442 sides and the inner surface of the side guards 530a,b, and extend downwardly to be flush with the bottom of the skid plate 442. The guards 482 cooperate with the leading end of the skid plate 442 to seal off that portion of the enclosure of the non-engaged portions of the cutting blade 446.

The cover 502 and housing 496 enclose the upper portion of the non-engaged portion of the rotating cutting blade 446. The concrete 430 encloses the bottom, engaged portion of the cutting blade 446 as the concrete which is being cut surrounds that engaged portion. The side shields 530, the end shields 482, 546, the top and bottom shields 540, 542 cooperate with the cover 502, the housing 496, and the skid plate 442 to enclose the remainder of the non-engaged portion of the rotating cutting blade 446, while allowing relative motion between the housing 496 and the skid plate 442.

It is noted that even with the guards and shields, small holes exist through which noise from the cutting blade 446 can escape. It has been determined, however, that these holes and cracks are small enough that during use of the saw 420, dislodged concrete fills these gaps quickly, effectively sealing off these cracks and holes, and further acting to deaden the sound created during cutting. It should also be noted that the placement of the guards 530a,b, 482 and shields 540, 542 in conjunction with the housing 496 eliminates direct pathways for the sound to escape from the enclosure to the user.

There are no blocks 548 depending from the support 477 at the trailing end 464 of the skid plate 442. It is important that there be a space at the trailing end 464 of the skid plate 442 to allow concrete which is displaced by the cutting blade 446 and thrown into the enclosed space between the housing 496 and guards 530a,b, 482 to escape and be deposited on the concrete surface. The size of this opening on each side of the skid plate 442 is preferably about 0.75 inches in height and 0.85 inches in width. This space between the base of the rear support 477 and the inner surfaces of the side guards 530a,b, as described above, is small enough that the removed concrete will fill this area and thus deaden the sound, and at the same time large enough that as concrete builds up in the enclosed area, the removed concrete can pass through this gap and out onto the concrete surface 430.

Substantially all of the cutting blade is enclosed such that any holes or openings are sufficiently small that they fill up with the cut concrete during operation of the saw, or have a non-linear path from any opening to the atmosphere. The only possible exceptions to this might be the tunnel or recess (78 in FIG. 3) at the trailing edge of the cutting blade 246, or the slot 538 surrounding the drive shaft 504. In the case of the recess, the spacing between the cutting blade 246 and the adjacent portions of the slot in the skid plate 442 are sufficiently small, and the cutting blade 446 is just at the surface of the concrete 430, such that the noise escaping the opening does not offset the substantial reductions in noise from the remaining enclosure. In the case of the slot 538 around the drive shaft 504, the sound escaping is directed toward the motor and into the saw, so that it does not directly emanate to the atmosphere. Here too, the noise escaping the opening does not offset the substantial reductions in noise from the remaining enclosure.

Of course, as the cutting blade 446 is disengaged from the surface there will come a point at which the moveable shields are disengaged from the concrete surface such that noise from the cutting blade 446 escapes. A similar occurrence can take place if the cutting blade 446 is rotating as the blade is lowered against the concrete surface and before the moveable shields engage the concrete surface to enclose the cutting blade. Once engaged, however, the enclosure of the non-engaged portions of the cutting blade 446 serves to reduce the sound from the cutting of the concrete.

The overall construction, mounting and operation of the floating skid plate 242 is analogous to skid plate 42, and will not be repeated. During use of the saw 420, when the skid plate 442 is in contact with the concrete surface 400 and the cutting blade 446 is cutting, the side guards 530a,b rest upon and slide over the surface of the concrete 430. Because the side guards 530a,b are vertically movable with respect to the housing 496, movement of the housing 496 relative to the skid plate 442 does not affect the ability of the guards 496 to effectively enclose the sides of the cutting blade 446. Further, because the front and rear guards 482 are mounted on the supports 477, which are in turn connected to the members 484 which connect the skid plate 442 resiliently to the housing 496, the front and rear guards 482 move to the skid plate 442. This allows the structure which encloses the portion of the cutting blade 446 below the housing 496 to completely enclose the cutting blade 446 even when the skid plate 442 is moving in relation to the saw 420. In this manner, the sound created during cutting is always completely trapped by the enclosure, protecting the user and reducing the emitted noise.

It is believed that noise reductions of at least 10 decibels, as perceived by the operator of the saw, and preferably of substantially more, can be achieved with this movable enclosure. In addition to reducing the noise which the operator of the saw must tolerate, the disruption to surrounding persons is substantially reduced. This sound reduction is especially important when cutting in areas, such as residential neighborhoods, where cutting late at night or early in the morning is prohibited because it would disturb the people in the surrounding areas.

It will be understood that the above described arrangements of apparatus and the methods therefrom are merely illustrative of applications of the principles of this invention and many other embodiments and modifications may be made without departing from the spirit and scope of the invention.

What is claimed is:

1. An apparatus for use with a concrete saw having a rotating cutting blade with a leading cutting edge to cut grooves in a concrete surface as the saw is moved over the surface, comprising:

a skid plate having a slot through which the cutting blade extends during cutting, the skid plate having a support portion that contacts the surface being cut adjacent at least the leading cutting edge of the blade during cutting; and at least one resilient member having a first end connected to the concrete saw, and having a second end connected to the skid plate, the resilient member orientated to allow movement of the skid plate relative to the saw during cutting while also resiliently urging the skid plate against the concrete surface with a predetermined force.

2. An apparatus as defined in claim 1, further comprising rotatable mounting means on each end of the skid plate connecting the skid plate to the resilient members, each rotatable mounting means rotating about substantially parallel axes.

3. An apparatus as defined in claim 1, wherein there are two resilient members, each having one end connected to the saw and another end rotatably connected to opposing portions of the skid plate.

4. An apparatus as defined in claim 1, further comprising a member connected to opposing ends of the skid plate whereby those ends are urged toward each other.

5. An apparatus as defined in claim 1, further comprising a member connected to opposing ends of the skid plate whereby those ends are urged away from each other.

6. An apparatus as defined in claim 1, further comprising means for exerting a force on opposing ends of the skid plate to deform the support portion toward the surface to be cut when the skid plate is installed on a saw and before the support portion contacts the surface to be cut, the deformation being such that the support portion is substantially flat against the concrete surface during cutting.

7. An apparatus as defined in claim 1, further comprising means for exerting a force on opposing ends of the skid plate to deform the support portion away the surface to be cut when the skid plate is installed on a saw and before the support portion contacts the surface to be cut.

8. An apparatus for use with a concrete saw that has a rotating cutting blade with a leading cutting edge to cut grooves in a concrete surface as the saw moves across the surface, comprising:
  a skid plate having a first mounting portion;
  a support portion connected to the first mounting portion, the support portion having a slot through which the cutting blade extends during cutting;
  means connected to the saw and skid plate for resiliently urging the support portion against the concrete surface with a predetermined force during cutting, while allowing rotation and translation of the skid plate.

9. A concrete saw that cuts grooves in a concrete surface with a rotating cutting blade that rotates about a first axis as the saw traverses a portion of the concrete surface to cut the groove, comprising:
  wheels connected to the saw to movably support the saw on the surface of the concrete during cutting;
  a motor rotating the cutting blade in the surface of the concrete in an upcut direction as the saw is moved across the surface of the concrete;
  a support depending from the saw and configured to support the concrete along a sufficient length of the cutting blade and sufficiently close to the cutting blade so as to reduce raveling of the groove cut by the blade;
  a resilient mount intermediate the depending support and the saw resiliently urging the depending support toward the concrete surface to maintain the support of the concrete surface along a sufficient portion of the cutting blade to inhibit raveling of the concrete surface adjacent the groove even when the cutting blade rises partially out of the concrete surface during cutting.

10. A saw as defined in claim 9, wherein the depending support comprises a skid plate that is substantially flat during cutting, but has a member urging opposing ends of the skid plate together so that the plate is slightly bowed when the skid plate is not in contact-with the concrete surface.

11. A saw as defined in claim 9, further comprising a motor driving at least one of the wheels to propel the saw at a controlled speed across the concrete surface during cutting.

12. A saw as defined in claim 9, wherein the size of the wheels of the saw are such that the wheels do not leave permanent indentations of greater than 1/16 of an inch in concrete having a hardness such that a steel rod weighing about 5.75 pounds, having a diameter of 1.125 inches, when dropped from a height of about 24 inches from the surface of the concrete makes an indentation of about 1/32 of an inch or less with a flat end of the rod.

13. A concrete saw having a rotating cutting blade to cut grooves in a concrete surface as the saw is moved over the surface, comprising:
  a rotating cutting blade driven by a motor, both of which are mounted on a frame;
  a plurality of wheels connected to the frame to movably support the saw during cutting;
  a skid plate depending from the saw to support the concrete surface adjacent the cutting blade during cutting, the skid plate containing a slot through which the rotating cutting blade extends to cut the concrete, the slot being configured relative to the cutting blade so that raveling of the concrete from the cutting is reduced; and
  resilient members having one end connected to the skid plate to resiliently urge the skid plate toward the concrete surface whereby the skid plate maintains the support of the concrete surface along a sufficient portion of the cutting blade to inhibit raveling of the concrete surface adjacent the groove even when the cutting blade moves away from the concrete surface during cutting.

14. A saw as defined in claim 13, wherein one of the resilient members is rotatably connected to the skid plate and one resilient member is slidably connected to the skid plate.

15. A saw as defined in claim 14, further comprising:
  a load bearing member communicating with opposite ends of the skid plate to urge them to assume a predetermined position relative to one another wherein the support portion is bowed in a direction that would be toward the concrete surface to be cut when the skid plate is installed on the saw, but before the skid plate is placed in contact with the concrete surface for cutting.

16. A saw as defined in claim 14, further comprising:
  a load bearing member communicating with opposite ends of the skid plate to urge them to assume a predetermined position relative to one another wherein the support portion is bowed in a direction that would be away from the concrete surface to be cut when the skid plate is installed on the saw, but before the skid plate is placed in contact with the concrete surface for cutting.

17. A concrete saw having a rotating cutting blade with a leading cutting edge to cut grooves in a concrete surface as the saw is moved over the surface, comprising:
  a rotating cutting blade driven by a motor, both of which are mounted on a frame;
  a plurality of wheels connected to the frame to movably support the saw on the surface to be cut;
  a skid plate depending from the saw to support the concrete surface adjacent at least the leading cutting edge of the cutting blade during cutting, the skid plate having a support portion containing a slot through which the rotating cutting blade extends to cut the concrete, the skid plate being movably mounted relative to the saw and resiliently urged toward the concrete surface so that the skid plate maintains the support of the concrete surface along a sufficient portion of the cutting blade to inhibit raveling of the concrete surface adjacent the groove even when the cutting blade moves away from the concrete surface during cutting.

18. A method of supporting a skid plate for a concrete saw which cuts grooves in a concrete surface with a rotating cutting blade which rotates about a first axis as the saw traverses a portion of the surface to cut the groove, comprising the steps of:

configuring a skid plate with a first mounting portion that can be releasably fastened to the concrete cutting saw;

depending a support portion from the first mounting portion so that the support portion contacts the concrete surface during cutting;

forming a slot in the support portion through which the cutting blade extends during cutting, the slot being formed so that it surrounds a sufficient portion of the cutting blade sufficiently close to the cutting blade so that the support portion reduces raveling of the groove during cutting; and resiliently urging the support portion against the concrete surface with a predetermined force during cutting to maintain the support portion in contact with the concrete surface.

19. A method as defined in claim 18, wherein the resiliently urging step comprises the step of connecting at least one resilient member between the concrete saw and the skid plate so as to allow movement of the skid plate relative to the saw during cutting and to resiliently urge the skid plate against the concrete surface during cutting with a predetermined force.

20. A method as defined in claim 18, wherein the resiliently urging step comprises the steps of rotatably connecting a first end of first and second spring loaded members to the skid plate so the members can rotate about an axis parallel to rotational axis of the cutting blade;

connecting a second end of the first and second spring members to the saw; and slidably connecting one of the first ends to the skid plate to allow one of the spring loaded members to translate along the slot as well as rotate.

21. A method as defined in claim 18, comprising the further step of constraining opposite ends of the skid plate into a bowed configuration so that the support portion is bowed when the skid plate is mounted on the saw and not resting against the surface to be cut, but wherein the support portion is substantially flat when placed against the concrete surface during cutting.

22. A method as defined in claim 21, wherein the constraining step comprises the step of constraining opposing ends of the skid plate to deform the support portion away the surface to be cut when the skid plate is installed on a saw and before the support portion contacts the surface to be cut.

23. A method as defined in claim 18, comprising the further step of deforming the skid plate into a bowed configuration so that the support portion is bowed when the skid plate is mounted on the saw and not resting against the surface to be cut, but wherein the support portion is substantially flat when placed against the concrete surface during cutting.

24. A method of cutting concrete with a concrete saw that cuts grooves in a concrete surface with a rotating cutting blade that rotates about a first axis as the saw traverses a portion of the concrete surface to cut the groove, comprising the steps of:

movably supporting the saw on the surface of the concrete during cutting with a plurality of wheels connected to the saw;

rotating the cutting blade in the surface of the concrete as the saw is moved across the surface of the concrete;

supporting the concrete along a sufficient length of the cutting blade and sufficiently close to the cutting blade so as to reduce raveling of the groove cut by the blade;

movably mounting the concrete support relative to the saw in a direction that is generally perpendicular to the concrete surface being cut;

resiliently urging the concrete support toward the concrete surface to maintain the support of the concrete surface along a sufficient portion of the cutting blade to inhibit raveling of the concrete surface adjacent the groove even when the cutting blade rises partially out of the concrete surface during cutting.

25. A method as defined in claim 24, wherein the supporting step comprises the step of supporting the concrete with a plate that is substantially flat during cutting, but urging the ends of the plate together so that the plate is slightly bowed when the plate is not in contact with the concrete surface.

26. A method as defined in claim 24, further comprising the steps of:

providing motor driven power to at least one of the wheels to propel the saw at a controlled speed across the concrete surface during cutting.

27. A method as defined in claim 24, further comprising the step of:

rotating the cutting blade in an upcut direction; and selecting the size of the portions of the saw which movably support the saw on the concrete during cutting so that the movably supporting portions will not leave permanent indentations of greater than $1/16$ of an inch in concrete having a hardness such that a steel rod weighing about 5.75 pounds, having a diameter of 1.125 inches, when dropped from a height of about 24 inches from the surface of the concrete makes an indentation of about $1/32$ of an inch or less with a flat end of the rod.

28. A method of cutting concrete with a concrete saw which cuts grooves in a concrete surface with a rotating cutting blade that rotates about a first axis as the saw traverses a portion of the concrete surface to cut the groove, comprising the steps of:

rotating a cutting blade in the surface of the concrete to cut a groove;

movably supporting the saw on the surface of the concrete during cutting by a plurality of wheels;

depending a slotted skid plate from the saw to support the concrete surface adjacent the cutting blade during cutting, the rotating cutting blade extending through the slot to cut the concrete, the slot being configured relative to the cutting blade to inhibit raveling of the concrete surface during cutting;

movably mounting the skid plate relative to the saw so that the skid plate can move away from the concrete surface during cutting;

resiliently urging the skid plate against the concrete surface so that the skid plate maintains the support of the concrete surface along a sufficient portion of the cutting blade to inhibit raveling of the concrete surface adjacent the groove even when the cutting blade rises partially out of the concrete surface during cutting; and resiliently deforming the skid plate to counteract any undesirable deformation of the skid plate as it is urged against the concrete surface so that the portion of the skid plate supporting the concrete surface to inhibit raveling remains substantially flat when the skid plate is urged against the concrete during cutting.

29. A method as defined in claim 28, wherein the resiliently deforming step comprises the step of bowing the skid plate so that it bows toward the concrete surface to be cut when the skid plate is not urged against the surface and constraining the skid plate to maintain that bowed configuration when it is not urged against the concrete surface.

* * * * *